US010138823B2

(12) United States Patent
Ichi et al.

(10) Patent No.: US 10,138,823 B2
(45) Date of Patent: Nov. 27, 2018

(54) COMBUSTION ENGINE AIR INTAKE SYSTEM FOR MOTORCYCLE

(71) Applicant: Kawasaki Jukogyo Kabushiki Kaisha, Kobe-shi, Hyogo (JP)

(72) Inventors: Satoaki Ichi, Akashi (JP); Toshiro Inoue, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 100 days.

(21) Appl. No.: 15/289,460

(22) Filed: Oct. 10, 2016

(65) Prior Publication Data

US 2017/0114731 A1   Apr. 27, 2017

(30) Foreign Application Priority Data

Oct. 26, 2015  (JP) ................... 2015-210105
Oct. 26, 2015  (JP) ................... 2015-210106
Oct. 26, 2015  (JP) ................... 2015-210107

(51) Int. Cl.
| | |
|---|---|
| *F02D 23/00* | (2006.01) |
| *F02M 29/06* | (2006.01) |
| *F02B 33/40* | (2006.01) |
| *F02D 41/00* | (2006.01) |
| *F02M 35/16* | (2006.01) |

(Continued)

(52) U.S. Cl.
CPC .............. *F02D 23/00* (2013.01); *F02B 33/40* (2013.01); *F02D 41/0005* (2013.01); *F02D 41/0007* (2013.01); *F02M 29/06* (2013.01); *F02M 29/10* (2013.01); *F02M 35/162* (2013.01); *F04D 29/462* (2013.01); *F02D 2200/0406* (2013.01); *F02D 2200/604* (2013.01); *F02D 2200/606* (2013.01); *F05D 2250/51* (2013.01); *Y02T 10/144* (2013.01); *Y02T 10/42* (2013.01)

(58) Field of Classification Search
CPC .. F02D 23/00; F02D 41/0007; F02D 41/0005; F02D 2200/606; F02D 2200/604; F02D 2200/0406; F02B 33/40; F02M 29/06; F02M 35/162; F02M 29/10; F04D 29/462; Y02T 10/144; Y02T 10/42; F05D 2250/51
USPC ............................ 60/600, 602, 605.1, 605.2
See application file for complete search history.

(56) References Cited

U.S. PATENT DOCUMENTS

| | | | | |
|---|---|---|---|---|
| 2,069,640 A | * | 2/1937 | Beardsley, Jr. ........ | F02B 75/222 415/183 |
| 3,072,389 A | * | 1/1963 | MacInnes ................. | F02D 9/00 261/30 |

(Continued)

FOREIGN PATENT DOCUMENTS

WO   WO2011/080974   7/2011

*Primary Examiner* — Hoang Nguyen

(57) ABSTRACT

This supercharger for a motorcycle is driven by power of a crankshaft of a combustion engine, and compresses intake air to be supplied to the combustion engine. The supercharger has an impeller of a centrifugal type, and an intake air control valve is disposed on the upstream side of the impeller of the supercharger with respect to a flow direction of the intake air. The intake air control valve is disposed so as to face a suction port of the supercharger in the flow direction of the intake air. The intake air control valve adjusts the amount of the intake air flowing into the impeller, and in addition, provides a preswirl to the intake air flowing into the impeller.

20 Claims, 9 Drawing Sheets

(51) Int. Cl.
*F02M 29/10* (2006.01)
*F04D 29/46* (2006.01)

(56) References Cited

U.S. PATENT DOCUMENTS

| | | | | |
|---|---|---|---|---|
| 3,411,389 A | * | 11/1968 | Wiese | B21D 43/287 83/204 |
| 6,145,313 A | * | 11/2000 | Arnold | F02B 37/00 60/605.2 |
| 8,646,438 B2 | | 2/2014 | Saeki et al. | |
| 2005/0204730 A1 | * | 9/2005 | Tsukahara | F01N 3/22 60/290 |
| 2012/0260896 A1 | | 10/2012 | Saeki et al. | |
| 2013/0090839 A1 | * | 4/2013 | Ishigami | F02D 41/0005 701/108 |

* cited by examiner

LEFT
(OUTSIDE)

RIGHT
(INSIDE)

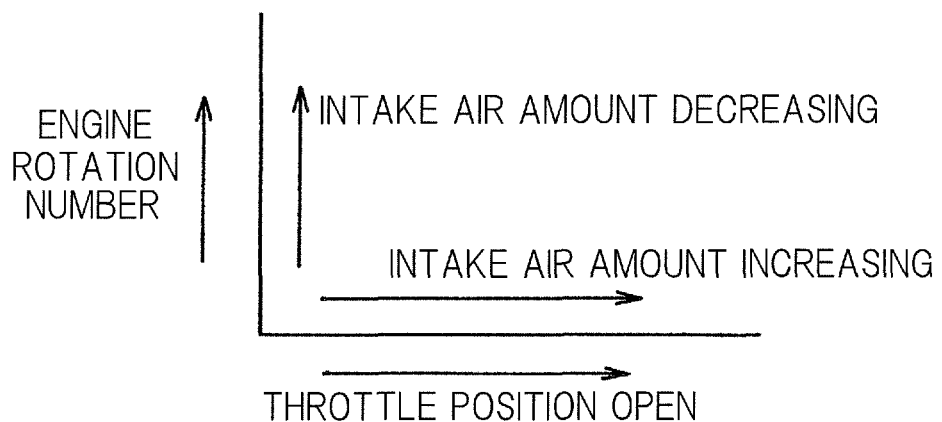

COMBUSTION ENGINE AIR INTAKE SYSTEM FOR MOTORCYCLE

CROSS REFERENCE TO THE RELATED APPLICATION

This application is based on and claims Convention priority to Japanese Patent Applications No. 2015-210105, No. 2015-210106, and No. 2015-210107, which were filed Oct. 26, 2015, the entire disclosure of which is herein incorporated by reference as a part of this application.

BACKGROUND OF THE INVENTION

Field of the Invention

The present invention relates to a combustion engine air intake system of a motorcycle provided with a supercharger which is driven by power of a combustion engine and which compresses intake air to be supplied to the combustion engine.

Description of Related Art

In order to enhance output of a combustion engine of a motorcycle, some combustion engines include a supercharger which pressurizes intake air (for example, WO2011/080974). The engine in WO2011/080974 includes a mechanical supercharger having therein a centrifugal type impeller which is driven by rotational force of a crankshaft of a combustion engine. In the motorcycle of WO2011/080974, in order to adjust the amount of intake air flowing into the supercharger, an intake air control valve is provided on the upstream side of the supercharger with respect to a flow direction of the intake air.

Since the weight of a motorcycle is relatively low, there are cases where a large change occurs in the rotation number of the combustion engine per unit time. This could cause delay in engine speed control effect obtained by changing the amount of intake air with the use of the intake air control valve. Specifically, when the intake air control valve is operated in a close direction to decrease the amount of intake air flowing into the supercharger, the fuel consumption reducing effect could be delayed due to delayed responsiveness to the decrease in the flow-in amount. When the intake air control valve is operated in an open direction to increase the amount of intake air flowing into the supercharger, increase of the output of the combustion engine could be delayed.

SUMMARY OF THE INVENTION

It is an object of the present invention to provide a combustion engine air intake system for a motorcycle that can enhance responsiveness to a change, of the amount of intake air flowing into a supercharger, caused by an intake air control valve.

In order to achieve the above object, a combustion engine air intake system for a motorcycle of the present invention includes: a supercharger configured to be driven by power of a combustion engine of the motorcycle and compress intake air to be supplied to the combustion engine; and an intake air control valve disposed on an upstream side of an impeller of the supercharger with respect to a flow direction of the intake air, and configured to adjust an amount of the intake air flowing into the impeller, wherein the intake air control valve is disposed so as to confront an inlet of the supercharger with respect to the flow direction of the intake air.

Here, "upstream side" and "downstream side" respectively mean the upstream side and the downstream side in the flow direction of the intake air.

According to this configuration, the intake air control valve can be disposed close to or in the vicinity of the inlet of the supercharger. Accordingly, space between the intake air control valve and the supercharger, that is, the volume (length) of the passage which connects the intake air control valve to the supercharger is reduced. As a result, the amount of air in the space between the intake air control valve and the supercharger is reduced. Thus, the pressure of the air on the upstream side of the supercharger and on the downstream side of the intake air control valve is quickly changed in accordance with the change in the amount of the intake air caused by the intake air control valve. Accordingly, responsiveness to the change in the amount of the intake air is improved. Specifically, by closing the intake air control valve, it is possible to reduce the workload of the supercharger, thereby to reduce the fuel consumption. By opening the intake air control valve, it is possible to increase the workload of the supercharger, thereby to enhance the output of the combustion engine. Further, in a region where the demanded level of output of the combustion engine during travel of the vehicle is low, if the flow-in amount of the intake air is decreased by throttling the intake air control valve, the amount of the intake air can be prevented from becoming excessive. In this manner, even when power of the supercharger is taken out from the crankshaft, the workload of the supercharger can be reduced, and thus, the fuel mileage or fuel consumption of the motorcycle is improved.

Preferably, in the combustion engine air intake system of the present invention, the intake air control valve is directly connected to an impeller housing which covers the impeller of the supercharger. According to this configuration, the space between the intake air control valve and the supercharger is further reduced, and thus, responsiveness to the change in the amount of the intake air is further improved.

Preferably, the combustion engine air intake system of the present invention further includes a throttle valve disposed on a downstream side of the supercharger in an air intake passage with respect to the flow direction, and configured to adjust the amount of the intake air to be supplied to a cylinder of the combustion engine, wherein the throttle valve is opened and closed on the basis of a throttle operation performed by a rider. According to this configuration, the intake air control valve is provided separately from the throttle valve. Thus, the fuel consumption can be reduced while the output operation performed by the rider is reflected.

Preferably, in the combustion engine air intake system of the present invention, the intake air control valve is, in addition to an adjustment of the amount of the intake air flowing into the impeller, configured to guide the intake air so as to swirl about a rotation shaft of the impeller. According to this configuration, the intake air control valve can be used in two ways: for improving compressing efficiency (heat insulating efficiency) by providing the intake air with an appropriate swirl before the intake air is compressed by the impeller; and for reducing the fuel consumption by adjusting the flow-in amount of the intake air.

When the intake air control valve is configured to guide the intake air so as to swirl relative to the rotation shaft of the impeller, it is preferable that the intake air control valve is configured to adjust a guiding amount in a swirl direction in accordance with change in the amount of the intake air. According to this configuration, since the guiding amount is appropriately set, it is easy to realize both improvement of the compressing efficiency and reduction of the fuel consumption.

When the intake air control valve is configured to guide the intake air so as to swirl relative to the rotation shaft of the impeller, it is preferable that the intake air control valve includes: a plurality of valve shafts radially arranged relative to the rotation shaft of the impeller; and valve bodies provided for the respective valve shafts, and configured to be angularly displaced about axes of the valve shafts, respectively, in which case at a medium opening degree, each valve body is displaced to one side in a circumferential direction of the rotation shaft of the impeller, so as to extend from upstream toward downstream in the flow direction of the intake air. According to this configuration, since an appropriate guiding amount is set at the medium opening degree, it is possible to realize both improvement of the compressing efficiency and reduction of the fuel consumption.

Preferably, in the combustion engine air intake system of the present invention, the intake air control valve includes: a plurality of valve shafts radially arranged relative to the rotation shaft of the impeller; and valve bodies provided for the respective valve shafts, and configured to be angularly displaced about axes of the valve shafts, respectively. According to this configuration, compared with a case employing an intake air control valve that has one valve body, the dimension in the axial direction of the air intake system can be reduced.

Preferably, the combustion engine air intake system of the present invention further includes an air intake duct configured to guide incoming wind to the supercharger. According to this configuration, by throttling the intake air control valve, it is possible to suppress increase in the workload of the supercharger due to rise in the pressure in the air intake duct when the pressure of the incoming wind is high. Accordingly, increase in the fuel consumption can be prevented.

Preferably, the combustion engine air intake system of the present invention further includes an air intake box disposed on the downstream side of the supercharger with respect to the flow direction and configured to store the intake air, wherein an outlet of a relief passage of the air intake box is in communication with an upstream side of the intake air control valve in the air intake passage with respect to the flow direction. According to this configuration, when the pressure in the air intake box has exceeded a predetermined value, the relief valve is opened, whereby the upstream side and the downstream side of the supercharger in the air intake passage are communicated with each other. Accordingly, the pressure in the air intake box can be prevented from being excessively increased. If the intake air control valve is closed while the relief valve is open, the intake air relieved to the upstream side of the supercharger can be suppressed from advancing toward the supercharger. Accordingly, it is possible to prevent the workload of the supercharger from increasing during the relief, thereby to reduce the fuel consumption.

A control system for controlling a supercharger for a combustion engine of a vehicle of the present invention is a control system for controlling a supercharger for a combustion engine of a vehicle, which supercharger is driven by power of the combustion engine and compresses intake air to be supplied to the combustion engine. The control system includes: an intake air control valve disposed on an upstream side of the supercharger with respect to a flow direction of the intake air; and an intake air amount controller configured to control the intake air control valve so as to decrease an amount of the intake air when a predetermined output excess condition has been satisfied.

The amount of air required by the combustion engine for the motorcycle dynamically changes because of characteristics of the motorcycle. That is, the optimum point of the workload of the supercharger dynamically changes. When power for the supercharger is taken out from the rotational force of the crankshaft, the region where the workload of the supercharger is large can be matched with the high load region of the combustion engine. However, in a low load region, there are cases where the workload of the supercharger becomes excessive. Since power for the supercharger is taken out from the crankshaft, if the workload of the supercharger becomes excessive, the fuel mileage of the motorcycle is reduced. Thus, there is a demand for a system for controlling the supercharger for the combustion engine of the vehicle that can improve the fuel mileage.

According to the above-described control system for the supercharger for the combustion engine, when a predetermined output excess condition has been satisfied, the intake air control valve is controlled so as to decrease the amount of the intake air. Thus, the workload of the supercharger can be prevented from being excessive. Accordingly, even when power for the supercharger is taken out from the crankshaft, the workload of the supercharger does not become excessive. Thus, the fuel mileage of the motorcycle is improved.

Preferably, in the control system for the supercharger for the combustion engine of the present invention, the intake air amount controller determines the output excess condition on the basis of a driving operation performed by a driver. According to this configuration, valve control that reflects the driver's intention can be realized, and shortage/excess of the output of the combustion engine can be prevented.

Preferably, in the control system for the supercharger for the combustion engine of the present invention, the intake air amount controller determines the output excess condition on the basis of a vehicle state. The vehicle state includes change that occurs in the rotation number of the combustion engine or the traveling speed, for example. According to this configuration, by realizing the valve control on the basis of the vehicle state, it is possible to prevent shortage/excess of the output of the combustion engine.

Preferably, in the control system for the supercharger for the combustion engine of the present invention, by controlling the intake air control valve, the intake air amount controller provides a preswirl set in advance, to the intake air flowing into an impeller of the supercharger. According to this configuration, the intake air control valve can be used in two ways: for improving compressing efficiency (heat insulating efficiency) caused by the swirl flow, and for improving the fuel mileage by suppressing the flow-in amount of the intake air when the output excess condition has been satisfied.

Preferably, in the control system for the supercharger for the combustion engine of the present invention, an air intake box configured to store the intake air is disposed on a downstream side of the supercharger with respect to the flow direction, and a relief valve is provided on the air intake box and is configured to be opened, when a pressure in the air intake box becomes a predetermined value or higher, to cause a relief passage to be communicated with the air intake box, in which case the relief passage is in communication with the upstream side of the supercharger in an air intake passage with respect to the flow direction, and the intake air amount controller controls the intake air control valve in a close direction when the relief valve is open. According to this configuration, by closing the intake air control valve while the relief valve is open, it is possible to prevent rise in the load of the supercharger during the relief.

Preferably, in the control system for the supercharger for the combustion engine of the present invention, a throttle valve which controls the amount of the intake air in accordance with a throttle operation performed by a driver is disposed on a downstream side of the supercharger in the air intake passage with respect to the flow direction, and the intake air amount controller controls the intake air control valve on the basis of an operation amount of the throttle valve. According to this configuration, since the intake air control valve is provided separately from the throttle valve, various output controls can be realized.

Preferably, in the control system for the supercharger for the combustion engine of the present invention, the intake air amount controller determines that the output excess condition has been satisfied when it has been determined that the vehicle is in a non-acceleration state. The non-acceleration state includes a constant speed state, a deceleration state, and a throttle operation cancellation state of the vehicle, and a brake operation state performed by the driver, for example.

An air intake control unit for a supercharger of the present invention is an air intake control unit disposed at an inlet of a supercharger which compresses intake air for a combustion engine, and includes an intake air control valve in which a plurality of variable vanes are radially disposed relative to an axial direction of the valve, wherein the variable vanes are each set such that a mounting angle about a radial axis of the vane is adjustable in a state where a root portion of the variable vane and a tip end portion of the variable vane are supported.

In the combustion engine disclosed in WO2011/080974, an intake air control valve is provided on the upstream side of the supercharger so as to adjust the amount of intake air flowing into the supercharger, thereby reducing mechanical loss. However, since the valve body of the intake air control valve in WO2011/080974 is implemented by one butterfly valve, the intake air control valve is large in size, and thus, may interfere with another component. This results in decreased degree of freedom in arrangement. In addition, such an intake air control valve is easily affected by external force caused by change in the attitude of the vehicle body and vibration from the road surface. Thus, there is a demand for an air intake control unit for the supercharger that is space-saving and that is less likely to be affected by external force.

According to the air intake control unit for the supercharger according to the present invention, the intake air control valve in which a plurality of variable vanes are radially disposed is disposed at the inlet of the supercharger. Thus, the supercharger can be caused to operate in accordance with the necessary amount of air, and in addition, space can be saved. Further, since the variable vanes are set such that the mounting angle about the radial axis of the valve is adjustable in a state where the root portion thereof and the tip end portion thereof are supported, stable support is realized. Thus, the variable vanes are less likely to be affected by external force, and displacement of vanes due to vibration is easy to be restricted.

Preferably, in the air intake control unit for the supercharger of the present invention, the intake air control valve includes: a plurality of fixed vanes radially disposed relative to the axial direction on an upstream side of the intake air control valve with respect to a flow direction of the intake air; and a guide body provided with the fixed vanes, in which case the root portion of each variable vane is supported by the guide body. According to this configuration, the intake air can be smoothly guided by the fixed vanes and the variable vanes, and in addition, opposite end portions of each variable vane can be easily supported.

Preferably, in the air intake control unit for the supercharger of the present invention, the intake air control valve includes: a plurality of fixed vanes radially disposed relative to the axial direction on an upstream side of the intake air control valve with respect to a flow direction of the intake air; and a guide body provided with the fixed vanes, in which case when the intake air control valve is fully open, at least one of the variable vanes of the intake air control valve is aligned with a corresponding one of the fixed vanes of the guide body in the axial direction view. According to this configuration, resistance at the intake air control valve, when fully open is reduced.

Preferably, the air intake control unit for the supercharger of the present invention further includes a variable mechanism configured to adjust the mounting angle of each variable vane, wherein the variable mechanism includes: an arm coupled to each variable vane; and a rotation ring coupled to a tip end portion of each arm, and allows the rotation ring to be rotated, thereby causing the variable vane to be rotated via the arm. According to this configuration, the variable mechanism can be configured to be compact in the radial direction.

Preferably, when the variable mechanism includes the rotation ring, the intake air control valve includes: a plurality of fixed vanes radially disposed relative to the axial direction on an upstream side of the intake air control valve with respect to a flow direction of the intake air; and a guide body provided with the fixed vanes, in which case the rotation ring is disposed around an outer periphery of the guide body. According to this configuration, since the guide body and the rotation ring overlap each other in the radial direction, increase in the size in the axial direction can be prevented.

Preferably, in the air intake control unit for the supercharger of the present invention, the intake air control valve and an actuator therefor are supported by a casing of the supercharger. According to this configuration, a sub-assembly can be configured by assembling the intake air control valve and the actuator to the casing of the supercharger. Thus, by assembling the supercharger to the combustion engine, the intake air control valve and the actuator can also be mounted to the combustion engine at the same time, and therefore, assemblability is improved.

A motorcycle of the present invention is a motorcycle on which the air intake control unit for the supercharger of the present invention is mounted, wherein the supercharger is disposed rearward of a cylinder unit of the combustion engine, and the actuator is disposed rearward or forward of the supercharger. When the actuator is disposed rearward of the supercharger, the actuator can be prevented from interfering with another component. When the actuator is disposed forward of the supercharger, downsizing of the combustion engine can be realized by reducing the dimension in a front-rear direction or longitudinal direction of the motorcycle.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 11A is a chart showing tendencies of the amount of intake air and the reduction ratio;

FIG. 11B is a chart showing tendencies of the amount of intake air, the rotation number of the combustion engine, and the throttle opening degree; and FIG. 11C is a chart showing tendencies of the amount of intake air and the vehicle speed.

DESCRIPTION OF EMBODIMENTS

Hereinafter, preferred embodiments of the present invention will be described with reference to the drawings. The terms "left side" and "right side" used in this specification are the left side and the right side relative to a driver maneuvering a vehicle to travel forwards. The terms "upstream side" and "downstream side" are the upstream side and the downstream side in the flow direction of intake air.

Figure 1:
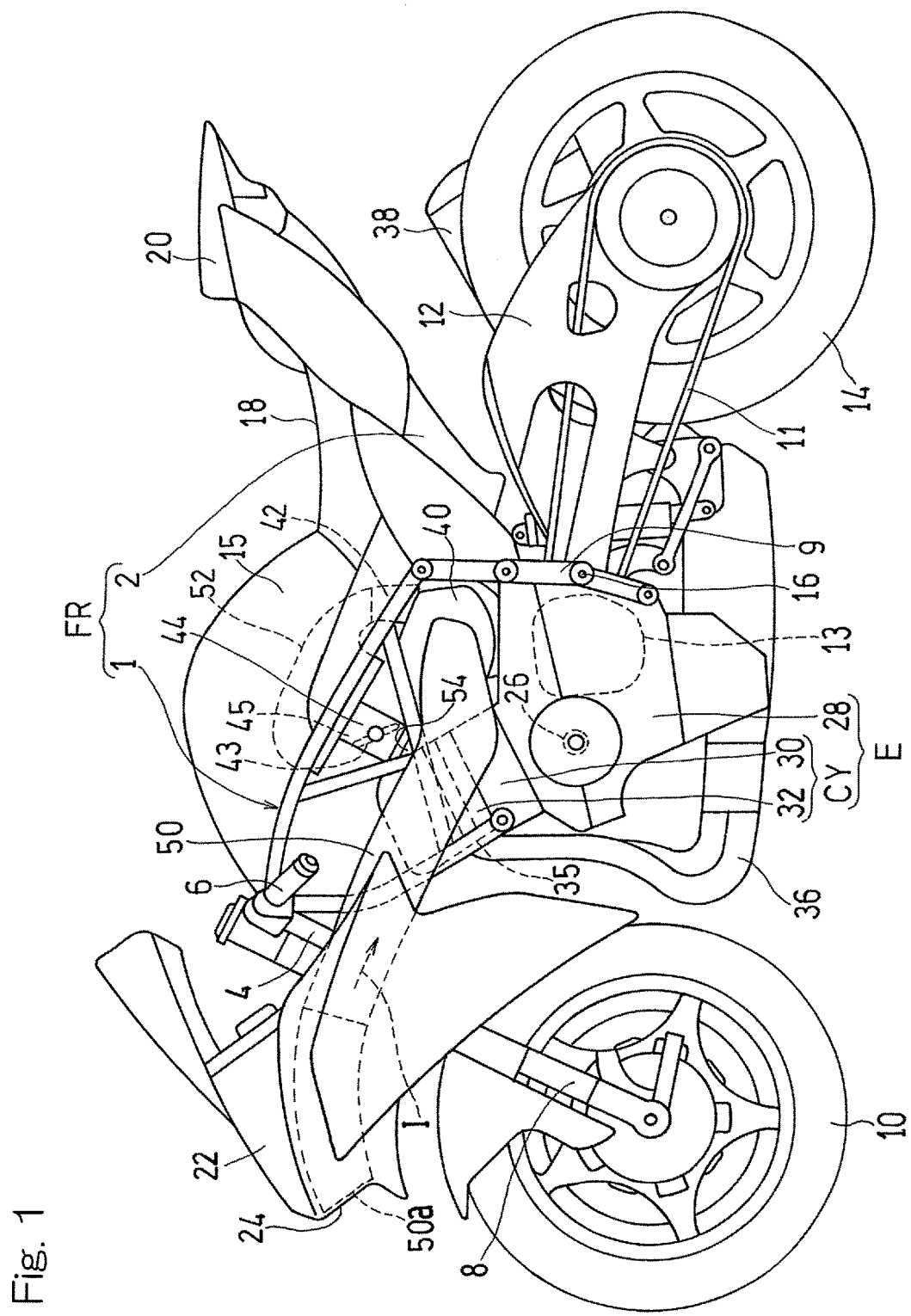
FIG. 1 is a side view showing a motorcycle provided with a combustion engine air intake system according to a first embodiment of the present invention.

FIG. 1 is a side view of a motorcycle showing a first embodiment of the present invention. A motorcycle frame structure FR includes a main frame 1 which forms a front half of the motorcycle frame structure FR, and a rear frame 2 which forms a rear half of the motorcycle frame structure FR. A head pipe 4 is provided at a front end of the main frame 1, and a front fork 8 is rotatably supported by the head pipe 4 through a steering shaft (not shown). A steering handle 6 is fixed to an upper end portion of the front fork 8, and a front wheel 10 is fitted to a lower end portion of the front fork 8.

A swingarm bracket 9 is provided at a rear end portion of the main frame 1. A swingarm 12 is supported by the swingarm bracket 9 for swing movement in an up-down direction or vertical direction about a pivot shaft 16 which is mounted to the swingarm bracket 9. A rear wheel 14 is rotatably supported by a rear end portion of the swingarm 12.

An engine E is fitted to a lower portion of the main frame 1 at the front side of the swingarm bracket 9. The rotational force of the engine E is changed in terms of speed by a gearbox 13, and then is transmitted to the rear wheel 14 via a drive chain 11 to drive the rear wheel 14. The engine E is a parallel multi-cylinder combustion engine having a plurality of cylinders aligned in the axial direction of a crankshaft 26. In the present embodiment, the engine E is a multi-cylinder combustion engine having four cylinders with four cycles. However, the type of the engine E is not limited thereto.

The engine E includes: a crankcase 28 which supports the crankshaft 26 which is an engine rotation shaft; a cylinder block 30 which projects upward from an upper surface of a front portion of the crankcase 28; and a cylinder head 32 disposed above the cylinder block 30. A rear portion of the crankcase 28 also serves as a transmission case which accommodates the gearbox 13 therein. The cylinder block 30 and the cylinder head 32 are inclined forward, and cooperate together to form a cylinder unit CY of the engine E. That is, the engine E has a substantially L shape in a side view.

Four exhaust pipes 36 are connected to four exhaust ports 35 in a front surface of the cylinder head 32. The four exhaust pipes 36 are merged together at a location beneath the engine E, and are connected to an exhaust muffler 38 which is disposed at the right side of the rear wheel 14.

A fuel tank 15 is disposed on an upper portion of the main frame 1, and a rider's seat 18 and a passenger's seat 20 are supported by the rear frame 2. In addition, a cowling or fairing 22 made of a resinous material is mounted on a front portion of the motorcycle. The cowling 22 covers a portion from front of the head pipe 4 to outer lateral sides of the front portion of the motorcycle. An air inlet 24 is formed in the cowling 22. The air inlet 24 is located at a front end of the cowling 22, and takes in intake air from the outside to the engine E.

An air intake duct 50 is disposed at the left side of the motorcycle frame structure FR. The air intake duct 50 is supported by the head pipe 4 such that a front end opening 50a thereof faces the air inlet 24 of the cowling 22. That is, the front end opening 50a of the air intake duct 50 communicates with the air inlet 24. The air inlet 24 is open forward, and takes in incoming wind as intake air I. Accordingly, the pressure of air introduced through the front end opening 50a of the air intake duct 50 is increased by a ram effect.

An air cleaner 40 and a supercharger 42 are disposed rearward of the cylinder block 30 and on an upper surface of a rear portion of the crankcase 28 so as to be aligned in a vehicle widthwise direction such that the air cleaner 40 is located at the outer side. The air intake duct 50 introduces the intake air I from front of the engine E through left outer lateral sides of the cylinder block 30 and the cylinder head 32 via the air cleaner 40 into the supercharger 42. The supercharger 42 pressurizes air purified by the air cleaner 40 and supplies the purified air to the engine E.

An air intake box 52 is disposed between the supercharger 42 and an air intake port 54 in a rear portion of the cylinder head 32, and the supercharger 42 and the air intake box 52 are directly connected to each other. The air intake box 52 stores high-pressure intake air I supplied from the supercharger 42. A throttle body 44 is disposed between the air intake box 52 and the air intake port 54. The air intake duct 50, the air cleaner 40, the supercharger 42, the air intake box 52 and the throttle body 44 cooperate together to form an air intake passage which introduces the intake air I to the engine E.

A throttle valve 43 is disposed inside the throttle body 44, i.e., on downstream side of the supercharger 42 and the air intake box 52 in the air intake passage 45. On the basis of a throttle operation performed by the rider, the throttle valve 43 controls the amount of intake air to be supplied to the air intake port 54 of the engine E. In the present embodiment, an electric throttle valve is used as the throttle valve 43. The throttle valve 43 is provided for each cylinder. Accordingly, responsiveness to a throttle operation is improved.

The throttle valve 43 of the present embodiment is driven by an actuator capable of being electronically controlled. Thus, on the basis of the throttle operation performed by the rider and additionally, on the basis of another driving situation, the amount of intake air to be supplied to the cylinder can be adjusted. Examples of such another driving situation include the rotation number of the combustion engine, the vehicle speed, the gear ratio, the amount of change per unit time in a throttle operation, and an output excess condition 140 being satisfied (described later).

The air intake box 52 is disposed above the supercharger 42 and the throttle body 44, and rearward of the cylinder head 32. The air cleaner 40 is disposed between the crankcase 28 and the air intake box 52 above the crankcase 28, in a side view. The fuel tank 15 is disposed above the air intake box 52 and the throttle body 44.

Figure 2:
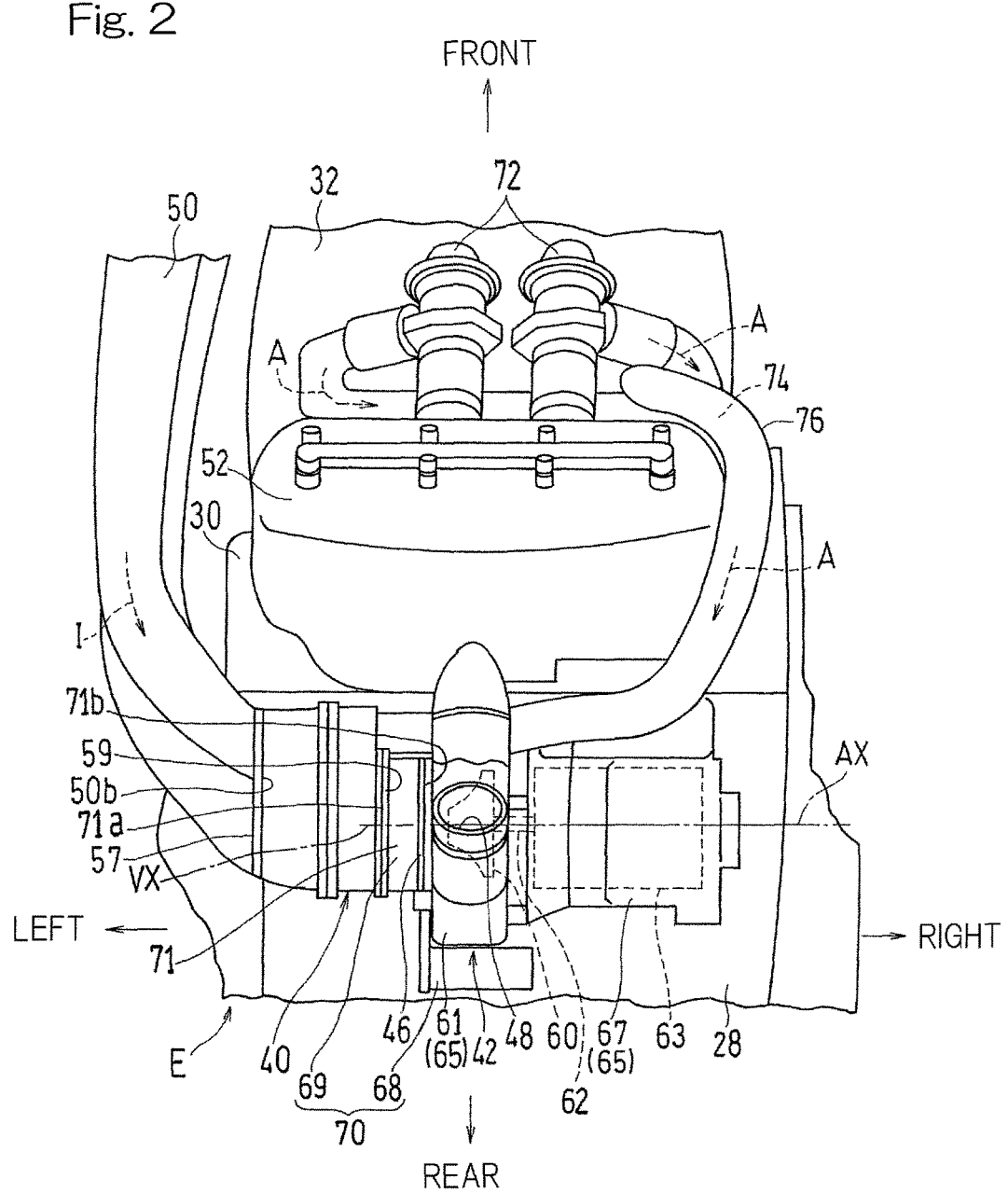
FIG. 2 is a perspective view of the combustion engine viewed obliquely from the rear and above.

As shown in FIG. 2, the supercharger 42 is disposed in the vicinity of and at the right side of the air cleaner 40, and fixed to an upper surface of the crankcase 28 by mean of a bolt (not shown). The supercharger 42 is a mechanical supercharger driven by the crankshaft 26 of the engine E shown in FIG. 1. Specifically, the driving force for the supercharger 42 is taken out from the upstream side relative to the gearbox 13 in the transmission path extending from the engine E to the rear wheel 14. The supercharger 42 shown in FIG. 2 has a rotation axis AX extending in the vehicle widthwise direction (right-left direction). The supercharger 42 has: a suction port 46 and a discharge port 48 both of which are located above the crankcase 28 and at a center portion of the engine E in the vehicle widthwise direction. The suction port 46 is opened leftward, and the discharge port 48 is opened upward.

The supercharger 42 includes: a centrifugal type impeller 60 which pressurizes intake air; a supercharger rotation shaft 62 to which the impeller 60 is fixed; an impeller housing 61 which covers the impeller 60; a transmission mechanism 63 which transmits power of the engine E to the impeller 60; and a transmission mechanism housing 67 which covers the transmission mechanism 63. The air cleaner 40 is disposed at one side in the vehicle widthwise direction relative to the impeller housing 61, and the transmission mechanism 63 is disposed at the other side in the vehicle widthwise direction relative to the impeller housing 61. The impeller housing 61 and the transmission mechanism housing 67 are coupled to each other by means of a bolt (not shown), and cooperate together to form a casing 65 for the supercharger 42.

An air intake control unit 70 which adjusts the amount of the intake air I flowing into the impeller 60 is disposed on the upstream side of the impeller 60 of the supercharger 42. The air intake control unit 70 includes: an intake air control valve 69; an actuator 68 which drives the intake air control valve 69; and a variable mechanism 98 (described later) which transmits driving force of the actuator 68 to the intake air control valve 69. The intake air control valve 69 is coupled to the suction port 46 which is the inlet of the supercharger 42. The intake air control valve 69 adjusts the amount of the intake air I flowing into the impeller 60 and provides a preswirl (described later) to the intake air I flowing into the impeller 60.

The intake air control valve 69 and the actuator 68 are supported by the casing 65 of the supercharger 42. The actuator 68 is disposed radially outward of the supercharger 42, and in the present embodiment, is disposed rearward of the supercharger 42. The supercharger 42 and the intake air control valve 69 cooperate together to form a combustion engine air intake system. The intake air control valve 69 includes: a valve body composed of variable vanes 80 and fixed vanes 82 (described later); and a valve casing 71 which covers the valve body. In the valve casing 71, a cylindrical passage, and an inlet 71a and an outlet 71b of this passage are formed. An axis VX of the passage in the valve casing 71, i.e., the axis VX of the outlet 71b of the intake air control valve 69 is aligned with the rotation axis AX of the supercharger 42.

The valve casing 71 is disposed coaxially with the suction port 46 so as to confront the suction port 46 which is the inlet of the impeller housing 61 adjacent to the intake air control valve 69. Here, "disposed so as to confront" means that, viewed from the direction of the rotation axis AX of the supercharger 42, a part of the intake air control valve 69 overlaps the suction port 46 of the supercharger, preferably means that a part of the outlet 71b of the valve casing 71 overlaps the suction port 46 of the supercharger, and more preferably means that the axis VX of the outlet 71b of the intake air control valve 69 is aligned with the axis (the rotation axis of the supercharger) AX of the suction port 46 of the supercharger 42.

The valve casing 71 and the impeller housing 61 may be integrally formed or may be formed as separate members. The valve casing 71 is disposed in contact with the suction port 46 of the impeller housing 61 which is adjacent to the intake air control valve 69. The valve casing 71 supports the intake air control valve 69 in such a manner as to allow displacement of the intake air control valve 69. The intake air control valve 69 includes a valve shaft portion and a valve body portion. The valve body portion is formed in a non-circular shape, viewed from the valve shaft direction, specifically, formed in a plate shape. A valve shaft portion supports the intake air control valve 69 in such a manner as to allow angular displacement of the intake air control valve 69 about an axis AY of the valve shaft portion.

A cleaner outlet 59 of the air cleaner 40 is connected to the inlet 71a of the valve casing 71 of the intake air control valve 69. A rear end portion 50b of the air intake duct 50 is coupled to a cleaner inlet 57 of the air cleaner 40 by means of a bolt (not shown). Further, the suction port 46 of the supercharger 42 is directly connected to the outlet 71b of the valve casing 71 of the intake air control valve 69. That is, the air cleaner 40, the intake air control valve 69 and the supercharger 42 are disposed side by side in the vehicle widthwise direction, rearward of the cylinder block 30, above the crankcase 28, and inside the opposite outer side surfaces of the engine E. To the air cleaner 40, which is disposed on one side in the vehicle widthwise direction, i.e., disposed on the left side in the present embodiment, the air intake duct 50 is connected from outside in the vehicle widthwise direction.

In the present embodiment, the valve casing 71 is connected to the air cleaner 40 via a guide body 84 (described later). Therefore, the valve casing 71 is disposed, with respect to the flow direction of the intake air, between the cleaner outlet 59 of the air cleaner 40 and the suction port 46 of the impeller housing 61, and is disposed so as to be adjacent to the cleaner outlet 59 of the air cleaner 40 and the suction port 46 of the impeller housing 61. The outlet 71*b* of the valve casing 71 is formed to have the same outer shape as that of the suction port 46 of the impeller housing 61. Accordingly, air intake resistance can be reduced.

Relief valves 72 which suppress rise of the air pressure in the air intake box 52 are provided at a front portion of the air intake box 52. To the relief valves 72, a relief pipe 76 which forms a relief passage 74 is connected. That is, the relief valves 72 are opened when the pressure in the air intake box 52 exceeds a predetermined value, thereby causing the relief passage 74 to be communicated with the air intake box 52. The outlet of the relief passage 74 is in communication with the upstream side of the supercharger 42 and the intake air control valve 69 in the air intake passage 45, i.e., in the present embodiment, to the clean side of the air cleaner 40.

Figure 3:
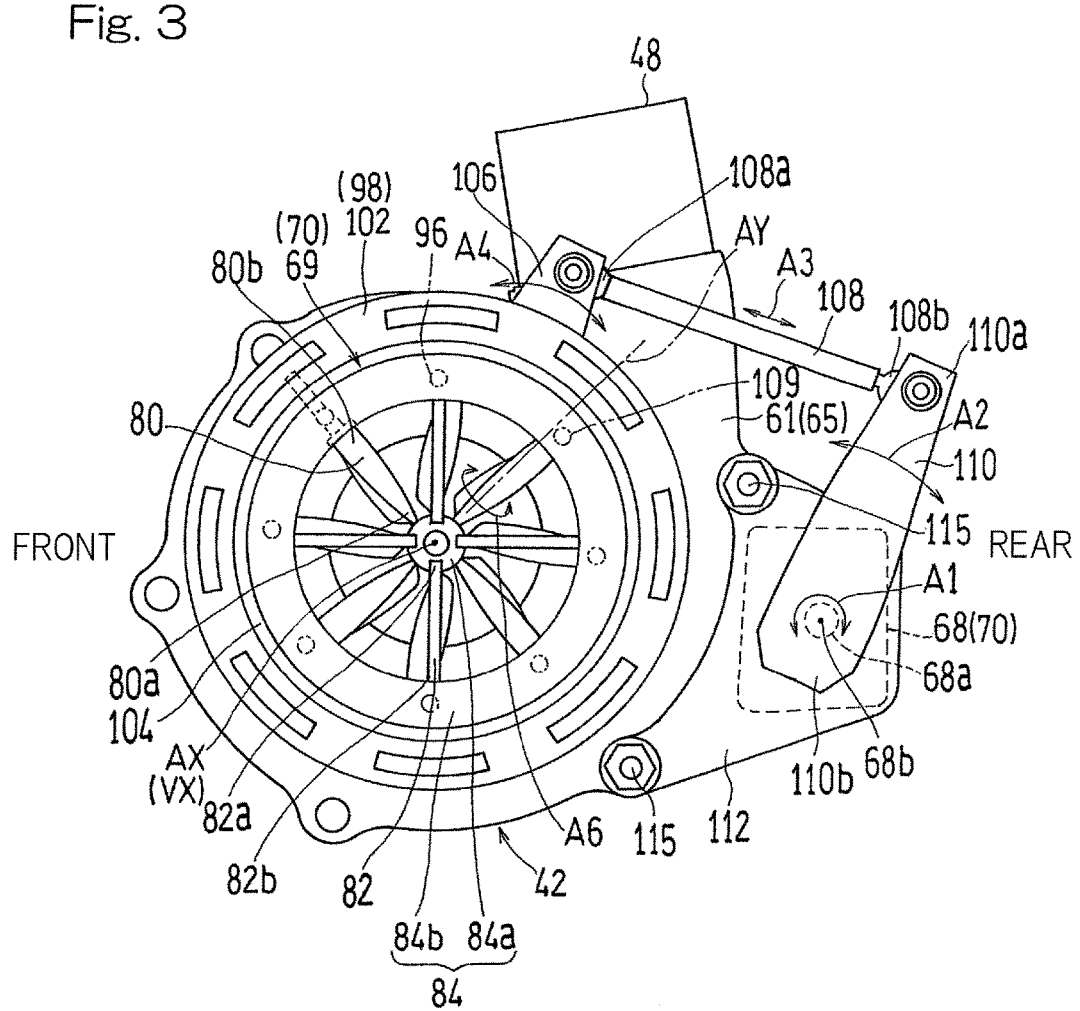
FIG. 3 is a side view showing a supercharger and an intake air control valve of the combustion engine.

As shown in FIG. 3, the intake air control valve 69 includes a plurality of variable vanes 80 radially arranged relative to the axis VX of the valve casing 71, i.e., relative to the rotation axis AX of the supercharger 42. In the present embodiment, eight variable vanes 80 are provided at equal intervals in the circumferential direction of the rotation axis AX of the supercharger 42. A mounting angle about the radial axis AY of each variable vane 80 is set to be adjustable in a state where a root portion (radially inner end portion) 80*a* of the variable vane 80 and a tip end portion (radially outer end portion) 80*b* of the variable vane 80 are supported.

The guide body 84 provided with a plurality of fixed vanes 82 radially arranged relative to the rotation axis AX of the supercharger 42 is disposed on the upstream side of the variable vanes 80 of the intake air control valve 69. A plurality of (four in the present embodiment) fixed vanes 82 are provided at equal intervals in the circumferential direction of the rotation axis AX of the supercharger 42. Four of the eight variable vanes 80 are disposed at the same positions in the circumferential direction as the four fixed vanes 82, and the remaining four variable vanes 80 are disposed at intermediate positions in the circumferential direction between the fixed vanes 82.

The guide body 84 includes a center portion 84*a* which is a center portion in the radial direction, and an annular portion 84*b* which is located on the radially outer side. A root portion 82*a* which is a radially inner end portion of each fixed vane 82 is coupled to the center portion 84*a*, and a tip end portion 82*b* which is a radially outer end portion is coupled to the annular portion 84*b*. Thus, since each fixed vane 82 is supported at the root portion 82*a* and the tip end portion 82*b*, stable support of the fixed vane 82 is realized.

Figure 4:
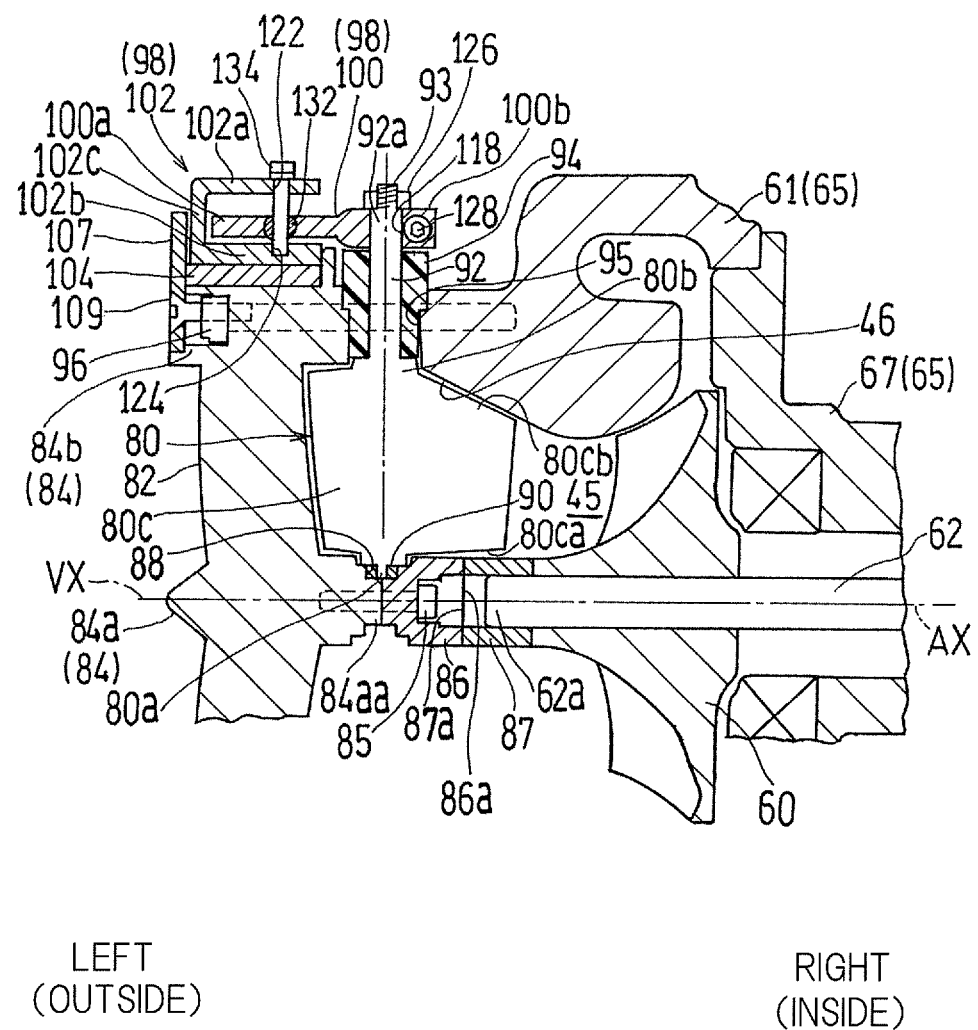
FIG. 4 is a cross-sectional view showing the supercharger and the intake air control valve.

As shown in FIG. 4, the guide body 84 is fastened to the impeller housing 61 by means of a bolt 96 which is a kind of a fastening member. A plurality of (four in the present embodiment) bolts 96 are disposed at equal intervals in the circumferential direction. To the inside of the center portion 84*a* of the guide body 84, a cylindrical holder 86 having a bottom is fastened by means of a bolt 85.

An end surface 86*a* of the holder 86 is in contact with an end surface 87*a* of a nut member 87 which is in thread-engagement with a tip portion 62*a* of the supercharger rotation shaft 62, such that the end surface 86*a* of the holder 86 is rotatable relative to the end surface 87*a* of the nut member 87. A recess 88, which is radially inwardly recessed, is formed in the outer peripheral surface of the portion where the holder 86 is coupled with the guide body 84, and the root portion 80*a* of each variable vane 80 is rotatably supported in the recess 88 via a sliding bearing 90. That is, the root portion 80*a* of each variable vane 80 is supported by the guide body 84.

The suction port 46 of the supercharger 42 forms a part of the air intake passage 45, and the cross section of the flow path is gradually reduced toward the impeller 60 on the downstream side. A valve body portion 80*c* of the variable vane 80 is located in the air intake passage 45 of the suction port 46 of the supercharger 42. An inner diameter portion 80*ca* of the valve body portion 80*c* extends substantially parallel to the rotation axis AX. An outer diameter surface 80*cb* of the valve body portion 80*c* is inclined to the radially inner side toward the downstream side, so as to extend along the shape of the suction port 46.

At the tip end portion 80*b* of the variable vane 80, a pivot member 92 which radially outwardly projects is provided. The pivot member 92 is rotatably supported by a bearing member 94. The pivot member 92 forms the valve shaft portion of the variable vane 80. The bearing member 94 is, for example, a sliding bearing made of a resinous material. However, the structure and the material of the bearing member 94 are not limited thereto. The bearing member 94 is mounted in a stepped mounting hole 95 formed in the mating surfaces of the impeller housing 61 and the guide body 84. The bearing member 94 is held between the impeller housing 61 and the annular portion 84*b* of the guide body 84 by means of the aforementioned bolts 96. The bearing member 94 and the annular portion 84*b* of the guide body 84 cooperate together to form the valve casing 71. A male screw portion 93 is formed in the distal end of the pivot member 92. To the male screw portion 93, the variable mechanism 98 which adjusts the mounting angle of the variable vane 80 is coupled by means of a nut 126 as described later.

The variable mechanism 98 includes: an arm 100 whose proximal end portion 100*b* is coupled and fixed to the pivot member 92 of the variable vane 80; and a rotation ring 102 coupled to a tip end portion 100*a* of the arm 100. The rotation ring 102 is disposed around the outer periphery of the guide body 84 and concentrically with the rotation axis AX. Specifically, the inner diameter surface of the rotation ring 102 and the outer diameter surface of the annular portion 84*b* of the guide body 84 are in contact with each other via a low friction member 104 so as to be rotatable relative to each other. The low friction member 104 is prevented from coming off from the guide body 84, by being pressed from outside in the axial direction by a cover 107 which is mounted to the guide body 84 by means of a bolt 109. A plurality of (four in the present embodiment) bolts 109 are disposed at equal intervals in the circumferential direction, for example. Instead of the low friction member 104, a roller bearing, for example, may be disposed between the inner diameter surface of the rotation ring 102 and the outer diameter surface of the annular portion 84*b* of the guide body 84. In this case, contact resistance due to friction between the rotation ring 102 and the guide body 84 can be further reduced. By the rotation ring 102 being angularly displaced, the variable vane 80 is pivotally moved via the arm 100.

The rotation ring 102 is rotated by the driving force of the actuator 68 (FIG. 2). Specifically, as shown in FIG. 3, one end 108*a* of a link rod 108 is coupled to a mounting piece 106 provided on the outer peripheral surface of the rotation ring 102, and one end 110*a* of a link lever 110 is coupled to the other end 108*b* of the link rod 108. To the other end 110*b* of the link lever 110, an output shaft 68*a* of the actuator 68 is connected. The actuator 68 is fixed by means of bolts 115 via a bracket 112 to the impeller housing 61 of the casing 65 of the supercharger 42.

The mounting piece 106 provided on the outer peripheral surface of the rotation ring 102 projects radially outward from the rotation ring body. Preferably, the mounting piece 106 is disposed at a place that overlaps a portion on the discharge port 48 side of the impeller housing 61 in a side view. That is, by locating the mounting piece 106 so as to overlap the portion on the discharge port 48 side of the impeller housing 61 at both of a fully-open position and a fully-close position, it is easy to protect the mounting piece 106 by means of the portion of the discharge port 48 of the impeller housing 61, and to prevent interference of the mounting piece 106 with another member. In other words, it is preferable that the rotation angle of the rotation ring 102 is formed so as to be smaller than the angle between both ends in the circumferential direction of the portion on the discharge port 48 side of the impeller housing 61.

When the actuator 68 is rotated in one direction A1 about an axis 68*b* thereof, the link lever 110 is rotated in a corresponding direction indicated by an arrow A2. Associated with this, the link rod 108 is advanced or retracted in a corresponding direction shown in an arrow A3, and the rotation ring 102 is rotated in a corresponding direction indicated by an arrow A4. That is, the variable mechanism 98 is operated by the actuator 68.

As described above, the intake air control valve 69 has a plurality of variable vanes 80. In the present embodiment, the axis AY of the valve shaft portion of each variable vane 80 radially extends relative to the supercharger rotation shaft 62, and the variable vanes 80 are arranged at equal intervals in the circumferential direction of the supercharger rotation shaft 62 and supported by the valve casing 71. In the present embodiment, each valve shaft portion is supported via the bearing member 94 in an angularly displaceable manner. The valve casing 71 supports the shaft portion of each variable vane 80, formed in the radially outer end relative to the rotation axis AX, such that the shaft portion can be angularly displaced. By the plurality of variable vanes 80 each being angularly displaced about the axis AY of the valve shaft portion, the area of the valve bodies, blocking the opening of the valve casing 71, changes. When the area of the valve bodies, blocking the opening of the valve casing 71, is increased, the amount of intake air to be introduced into the impeller housing 61 is decreased. When the area of the valve bodies, blocking the opening of the valve casing 71, is decreased, the amount of intake air to be introduced into the impeller housing 61 is increased.

The valve body portion 80*c* of each variable vane 80 is formed such that, relative to the valve shaft portion, the downstream side part of the valve body portion 80*c* is larger than the upstream side part of the valve body portion 80*c* in the flow direction of the intake air. Accordingly, while the variable vanes 80 are disposed close to or in the vicinity of the fixed vanes 82, the entire size of each variable vane 80 can be increased, and the number of the variable vanes 80 can be decreased. In addition, each variable vane 80 and its valve shaft portion can be disposed close to the impeller 60, whereby the space between the impeller 60 and the intake air control valve 69 can be reduced. In the present embodiment, the valve body portion 80*c* of the variable vane 80 extends to the downstream side in the flow direction of the intake air, relative to the end surface of the supercharger rotation shaft 62. By increasing the size of the valve body portion 80*c*, it is easy to suppress the amount of intake air while suppressing increase in the number of the variable vanes 80, thereby being able to enhance the fuel consumption reducing effect. Similarly, the radially outer side edge, relative to the supercharger rotation shaft 62, of the valve body portion 80*c* extends along the inner surface of the impeller housing 61. Accordingly, the size of the valve body portion 80*c* can be increased.

In the present embodiment, the guide body 84 is fastened to the impeller housing 61 by means of bolts. However, the guide body 84 may be formed integrally with the impeller housing 61. The guide body 84 is disposed on the upstream side relative to the intake air control valve 69. The guide body 84 includes: the plurality of fixed vanes 82 which guide intake air on the upstream side relative to the intake air control valve 69; the annular portion 84*b* which supports the radially outer ends of the respective fixed vanes 82; and the center portion 84*a* which supports the radially inner ends of the respective fixed vanes 82. In the present embodiment, the fixed vanes 82, the annular portion 84*b* and the center portion 84*a* are integrally formed by molding. The fixed vanes 82 radially extend relative to the supercharger rotation shaft 62, and are arranged at equal intervals in the circumferential direction of the supercharger rotation shaft 62. In the present embodiment, each fixed vane 82 is formed in a plate shape extending parallel to the supercharger rotation shaft 62. Since intake air is guided by the fixed vanes 82, it is easy to rectify the flow of intake air reaching the intake air control valve 69.

The annular portion 84*b* covers the fixed vanes 82 from radially outside, and is formed in a cylindrical shape which is coaxial with the supercharger rotation shaft 62. To the annular portion 84*b*, radially outer portions of the respective fixed vane 82 are coupled. In the entire region in the axial direction of the radially outer portion of each fixed vane 82, the annular portion 84*b* is coupled to the fixed vane 82. The annular portion 84*b* is fastened and fixed to the impeller housing 61 by means of the bolts 96, on the radially outer side relative to the fixed vanes 82. The annular portion 84*b* supports the variable mechanism 98 described later. The positions where the bolts are fastened are set to positions shifted in the radial direction from the positions where the variable vanes 80 are arranged.

The center portion 84*a* is disposed on the radially inner side of the fixed vanes 82, and is formed in a shaft shape which is coaxial with the supercharger rotation shaft 62. To the center portion 84*a*, radially inner portions of the respective fixed vanes 82 are coupled. In the entire region in the axial direction of the radially inner portion of each fixed vane 82, the center portion 84*a* is coupled to the fixed vane 82. The center portion 84*a* is formed in a cone shape whose outer diameter decreases toward upstream in the flow direction of the intake air. The center portion 84*a* is formed to have the same dimension as the outer diameter of the upstream-side end of the impeller 60, in the flow direction of the intake air. Accordingly, while the support rigidity for the fixed vanes 82 is increased, the resistance of intake air to the impeller 60 can be suppressed.

The center portion 84*a* extends further to the downstream in the flow direction of the intake air from the portion where the center portion 84*a* is coupled with the fixed vanes 82. In the present embodiment, the center portion 84*a* supports the shaft portion formed at the radially inner end of each variable vane 80 relative to the rotation axis AX, such that the shaft portion can be angularly displaced. Both ends of each variable vane 80 in the radial direction relative to the rotation axis AX are supported in this manner. Accordingly, even when the motorcycle has received vibrations from a road surface or the attitude of the vehicle body has changed, thus causing the supercharger 42 to be vibrated, it is possible to prevent the variable vanes 80 from coming into contact with peripheral members, and thus, to prevent the variable vanes 80 from being damaged.

Each variable vane 80 is formed such that the dimension in the radial direction of the shaft portion on the radially inner side relative to the rotation axis AX is smaller than that of the shaft portion on the radially outer side. Accordingly, even if the support portion is small, supporting the variable vane 80 on both sides can be easily realized. Further, the center portion 84*a* forms a confronting portion which confronts the upstream-side end portion of the impeller 60 in the flow direction of the intake air. The confronting portion is formed in the same dimension as the outer diameter of the upstream-side end of the impeller 60 in the flow direction of the intake air. Accordingly, intake air can be made less likely to be disturbed, and the volume of the space between the impeller 60 and the intake air control valve 69 can be reduced. The radially inner side edge, relative to the supercharger rotation shaft 62, of the valve body portion 80*c* of each variable vane 80 extends along the outer diameter of the center portion 84*a*. Accordingly, the size of the valve body portion 80*c* can be increased.

In the circumferential direction of the supercharger rotation shaft 62, at least one of the positions of the valve shaft portions of the plurality of variable vanes 80 is aligned with the positions where the plurality of fixed vanes 82 are formed. In the present embodiment, in the circumferential direction of the supercharger rotation shaft 62, the positions of the valve shaft portions of all the variable vanes 80 are aligned with the positions where the plurality of fixed vanes 82 corresponding thereto are formed. The number of the variable vanes 80 is preferably a common multiple of the number of the fixed vanes 82. Accordingly, all the fixed vanes 82 can have the valve shaft portions of the variable vanes 80 aligned therewith.

In the valve shaft portion of the variable vane 80, a portion projecting outward relative to the impeller housing 61 is formed. The bearing member 94 is press-fitted in the mounting hole 95. The mounting hole 95 is formed as a stepped hole, and the bearing member 94 also has a corresponding stepped portion formed therein. By these stepped portions being brought into contact with each other, the insertion position for the bearing member 94 is defined.

Figure 5:
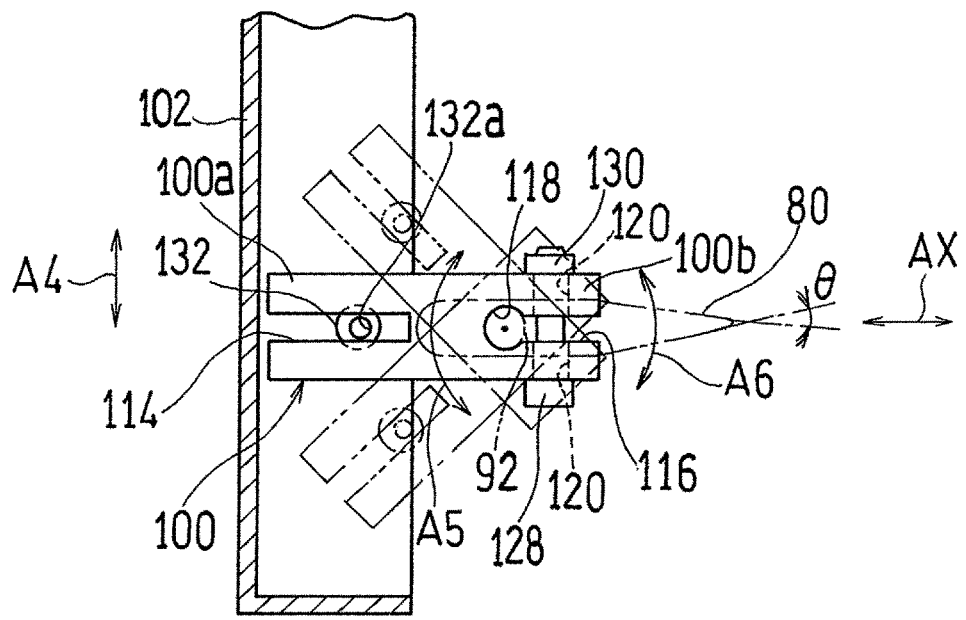
FIG. 5 is a plan view showing an arm and a rotation ring of a variable mechanism of the intake air control valve.

A structure of the variable mechanism 98 will be described. As shown in FIG. 4, the proximal end portion 100*b* of the arm 100 is formed to be thick in the radial direction compared with the tip end portion 100*a*. As shown in FIG. 5, in the tip end portion 100*a* of the arm 100, a first slit 114 which is a through-groove extending from a tip end of the arm 100 is formed. In the proximal end portion 100*b* of the arm 100, a second slit 116 which is a through-groove extending from the other end of the arm 100 is formed. Each of the first and second slits 114, 116 is a groove that passes through the arm 100 in the radial direction. A shaft insertion hole 118 is formed in the proximal end portion 100*b* of the arm 100. The shaft insertion hole 118 is a through-hole continued from the second slit 116.

Further, a first bolt insertion hole 120 having an axis perpendicular to the axis of the shaft insertion hole 118 is formed in the proximal end portion 100*b* of the arm 100. The first bolt insertion hole 120 extends across the two portions in the arm 100 which are separated by the second slit 116.

As shown in FIG. 4, a cross section, of the rotation ring 102, that contains the rotation axis AX has a U-shape facing inside along the axis direction (the vehicle widthwise direction). The rotation ring 102 has an outer wall 102*a* which is on the radially outer side, an inner wall 102*b* which is on the radially inner side, and a connection wall 102*c* which connects the outer wall 102*a* and the inner wall 102*b*. The inner wall 102*b* is formed thicker than the outer wall 102*a*. A second bolt insertion hole 122 extending in the radial direction is formed in the outer wall 102*a*. A first threaded hole 124 is formed in the inner wall 102*b* at a position corresponding to the second bolt insertion hole 122.

A tip portion 92*a* of the pivot member 92 is inserted into the shaft insertion hole 118 in the proximal end portion 100*b* of the arm 100, and the nut 126 is thread-engaged with the male screw portion 93 of the pivot member 92. Further, a bolt 128 is inserted into the first bolt insertion hole 120 in the proximal end portion 100*b* of the arm 100 shown in FIG. 5, and is fastened with a nut 130. Accordingly, the variable vane 80 shown in FIG. 4 and the arm 100 are coupled such that relative rotation therebetween is not allowed.

In the first slit 114 of the tip end portion 100*a* of the arm 100, a spherical seat is formed by two opposing inner surfaces of the first slit 114 respectively being recessed in partially spherical shapes. A spherical body 132 such as, for example, a pillow ball is fitted in this spherical seat 114. Specifically, the spherical body 132 is supported in the first slit 114 of the arm 100 so as to be slidable in the axis AY direction of the valve shaft portion. Instead of the spherical body 132, an elliptical body may be used. The arm 100 supports the spherical body 132 such that the spherical body 132 can be angularly displaced about the axis AY, in a cross section perpendicular to the axis AX of the supercharger rotation shaft.

The slide portion composed of the spherical body 132 and the spherical seat 114 is covered by the outer wall 102*a* of the rotation ring 102. Accordingly, entry of foreign matter into the slide portion can be prevented, and sliding performance can be easily maintained. If the rotation ring 102 is provided on the side where a side stand is disposed, it is easy to prevent raindrops from falling onto the rotation ring 102.

In the spherical body 132, a third bolt insertion hole 132*a* which passes through the spherical body 132 in the radial direction is formed. The tip end portion 100*a* of the arm 100 is coupled to the rotation ring 102 via the spherical body 132. Specifically, as shown in FIG. 4, a bolt 134 which is a pin member is inserted, from radially outside, into the second bolt insertion hole 122 in the outer wall 102*a* of the rotation ring 102, and then into the third bolt insertion hole 132*a* in the spherical body 132, and thereafter is fastened into the first threaded hole 124 in the inner wall 102*b* of the rotation ring 102. Specifically, the bolt 134 is supported by the spherical body 132 so as to be slidable in the axial direction of the bolt 134. Accordingly, the rotation ring 102 and the tip end portion 100*a* of the arm 100 are coupled to each other.

In this state, when the rotation ring 102 shown in FIG. 5 is rotated in the arrow A4 direction, the arm 100 is rotated in the direction indicated by an arrow A5. That is, when the rotation ring 102 is rotated in the direction indicated by the arrow A4 shown in FIG. 3, the variable vane 80 is rotated in the direction indicated by an arrow A6 via the arm 100. Specifically, the variable vane 80 is rotated about the axis AY which extends in the radial direction of the intake air control valve 69. Accordingly, a mounting angle θ of the variable vane 80 relative to the rotation axis AX of the supercharger (the axis VX of the outlet of the intake air control valve) becomes adjustable. The axis AY is aligned with the axis of the pivot member 92. FIG. 3 shows the state where the intake air control valve 69 is fully opened.

Since the rotation ring 102 has a relatively small radius, when the rotation ring 102 has been angularly displaced from the fully-open position to the fully-close position, the position of the rotation ring 102 in the radial direction relative to the arm 100 is greatly changed. In the present embodiment, since the spherical body 132 and the bolt 134 are configured to be slidable in the axial direction of the bolt 134 (radial direction of the valve 69), such a change in the position in the radial direction can be absorbed.

In addition, since the rotation ring 102 has a relatively small radius, when the rotation ring 102 has been angularly displaced from the fully-open position to the fully-close position, the angle of the plane of the arm 100 relative to the axial direction of the bolt 134 is greatly changed. In the present embodiment, since the spherical body 132 is configured to be angularly displaced about the axis AY in the arm 100, the spherical body 132 can be angularly displaced relative to the arm 100, following the movement of the axis of the bolt 134. Accordingly, the tilt of the plane of the arm relative to the axial direction of the bolt 134 can be absorbed. Since the rotation ring 102 and the arm 100 are coupled to each other via the spherical body 132 and the spherical seat 114, even if the relative position between the rotation ring 102 and the arm 100 is changed, such a change is absorbed by the spherical body 132. Accordingly, the rotation ring 102 and the arm 100 can smoothly slide.

In the present embodiment, at the dead middle position between the fully-open position and the fully-close position, the distance in the radial direction between the arm 100 and the rotation ring 102 becomes maximum. Accordingly, it is possible to prevent increase in the sliding range of the bolt 134 along the first slit 114, and thus, to reduce the interval in the radial direction of the pivot member 92 between the arm 100 and the rotation ring 102. In addition, in the present embodiment, at the dead middle position between the fully-open position and the fully-close position, the plane of the arm 100 becomes perpendicular to the axis of the bolt 134. This reduces the amount by which the range of the angular displacement of the spherical body 132 is shifted from the axis of the bolt 134.

The rotation ring 102 is formed in an annular shape which is formed around the outer periphery of the guide body 84. Since the guide body 84 also serves as a support member which supports the rotation ring 102 in an angularly displaceable manner, the number of components can be reduced. In addition, since the rotation ring 102 is provided around the outer periphery of the guide body 84, the rotation ring 102 can be disposed close to the arm 100, and thus, the rotation ring 102 can be downsized. The rotation ring 102 has a larger inner diameter than the suction port 46 of the impeller housing 61, and has an outer diameter smaller than the outer diameter of the impeller housing 61. Accordingly, increase in the dimension in the radial direction of the air intake control unit 70 can be prevented.

Figure 6:
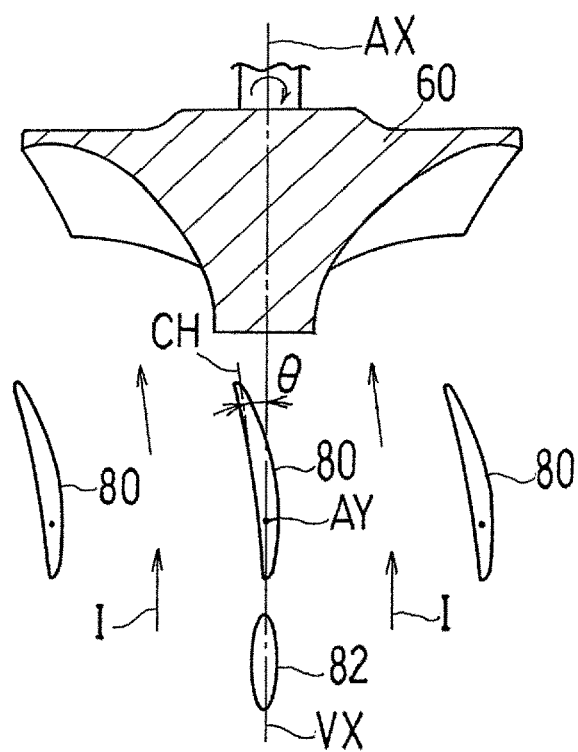
FIG. 6 is a schematic diagram showing a fully-opened state of the intake air control valve.
Figure 7:
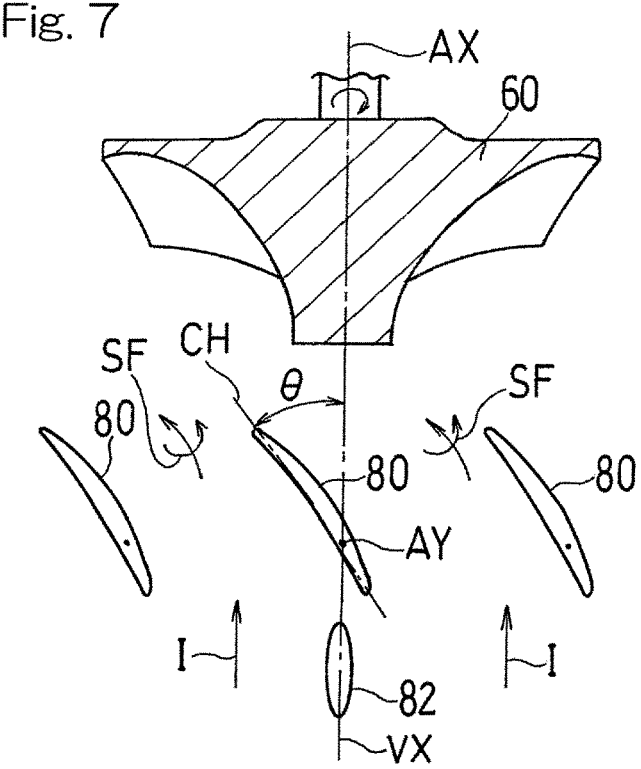
FIG. 7 is a schematic diagram showing a medium-open state of the intake air control valve.
Figure 8:
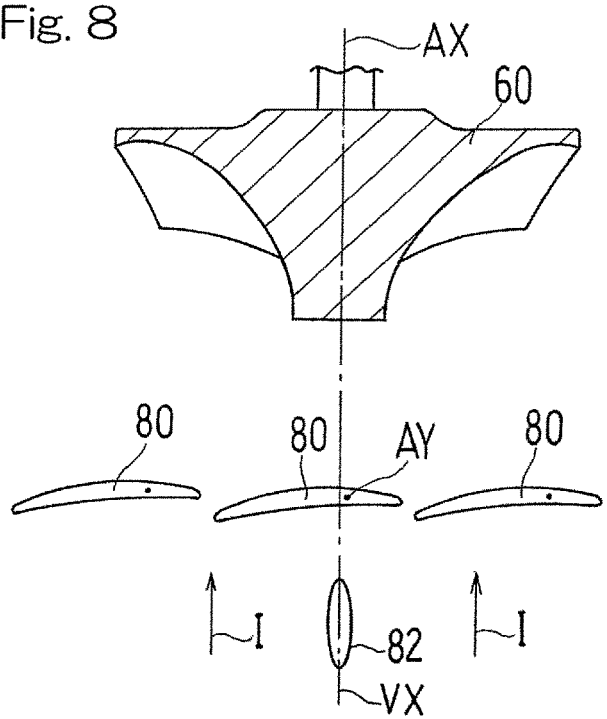
FIG. 8 is a schematic diagram showing a fully-closed state of the intake air control valve.

Each of FIGS. 6 to 8 is a longitudinal cross-sectional view along the rotation axis AX. FIG. 6 shows a fully-opened state of the intake air control valve 69, FIG. 7 shows a medium-open state thereof, and FIG. 8 shows a fully-closed state thereof. In the fully-opened state, the mounting angle $\theta$ is small, which angle $\theta$ is the angle between the rotation axis AX and a chord line CH obtained by connecting the leading edge of the variable vane 80 and the trailing edge thereof with a straight line. Since the chord line CH and the rotation axis AX are not on the same plane, the mounting angle $\theta$ is the angle between the rotation axis AX and the chord line CH on a plane of projection viewed from the radial direction. By the variable vane 80 and the fixed vane 82 at this rotation position, the intake air I is guided substantially in the rotation axis AX direction, to be smoothly introduced into the impeller 60 of the supercharger 42. At this time, the variable vane 80 and the fixed vane 82 are aligned with each other, viewed in the axial direction. The reference line for which the mounting angle $\theta$ is zero is not limited to the rotation axis AX, and can be set as desired.

In the present embodiment, the cross-sectional shape in each variable vane 80, perpendicular to the axial direction of the valve shaft thereof, is in a blade shape. In the fully-opened state, the area of the variable vane 80 that blocks the outlet 71b of the valve casing 71 becomes minimum. In the fully-opened state, the lateral surface of the variable vane 80 in the circumferential direction of the supercharger rotation shaft 62 becomes parallel to the supercharger rotation shaft 62, or most close to parallel to the supercharger rotation shaft 62.

In the medium-open state, a rotation position for which the mounting angle $\theta$ is large is set, and the intake air I is guided by the fixed vanes 82 in the rotation axis AX direction, and then, is guided by the variable vanes 80 in a direction inclined relative to the rotation axis AX, while the intake air I is provided with a preswirl. Accordingly, the amount of intake air flowing into the impeller 60 of the supercharger 42 is restricted. In this manner, each variable vane 80 also has a function of providing the preswirl to the intake air I, in addition to adjusting the opening degree. A preswirl SF flows while rotating concentrically with the rotation axis AX.

In the medium-open state, the lateral surface of the variable vane 80 in the circumferential direction of the supercharger rotation shaft 62 is inclined relative to the supercharger rotation shaft 62. As the amount of angular displacement of the variable vane 80 is increased from that in the fully-opened state, the inclination is increased accordingly, whereby the area of the outlet 71b of the valve casing 71 that is blocked by the variable vanes 80 is increased. In the present embodiment, each variable vane 80 is inclined so as to circumferentially guide intake air, toward the flow direction downstream of the intake air, in a direction reverse to the rotation direction of the impeller 60. In the present embodiment, when the impeller 60 is rotated counterclockwise viewed from the inlet side, the variable vane 80 guides the intake air, at the medium opening degree, such that the intake air is directed clockwise in the flow direction of the intake air. Accordingly, the intake air guided by the variable vane 80 can be directed toward the vane portion of the impeller 60. Accordingly, the amount of the intake air to be centrifugally guided by the impeller 60 can be increased, and thus, the pressure-feed amount by the impeller 60 can be increased.

In the fully-closed state, substantially no intake air I flows into the impeller 60 of the supercharger 42 due to the variable vanes 80. The fully-closed state is a state where the area of the variable vane portion that blocks the outlet 71b of the valve casing 71 becomes maximum. In this way, each variable vane 80 is configured to be angularly displaced about the axis, thereby being able to change the amount of the intake air between the fully-opened state and the fully-closed state.

In the fully-closed state, the lateral surface of the variable vane 80 in the circumferential direction of the supercharger rotation shaft 62 is inclined to the maximum relative to the supercharger rotation shaft 62. Accordingly, the resistance of intake air to the valve casing 71 becomes maximum, whereby the amount of the intake air passing through the intake air control valve 69 is greatly suppressed. It should be noted that, even in the fully-closed state, the outlet 71*b* of the valve casing 71 is not fully blocked, and a small amount of intake air is allowed to pass therethrough. It is preferable that, in the fully-closed state, each variable vane 80 is configured so as to partially overlap its adjacent variable vane 80. Accordingly, the air intake restricting effect can be enhanced. In this case, in order to prevent interference between the overlapping portions of the variable vanes 80, it is preferable that one variable vane 80 is formed to be recessed in the flow direction of the intake air, relative to the other variable vane 80.

The variable mechanism 98 is operable to angularly displace the valve shaft portion of each variable vane 80 about the axis thereof. The variable mechanism 98 angularly displaces a plurality of variable vanes 80 in an interlocked manner. In the present embodiment, by using a cam mechanism, the variable mechanism 98 angularly displaces the variable vanes 80 in an interlocked manner. Specifically, the rotation ring 102 is provided which is a displacing body that displaces each arm 100 coupled and fixed to the valve shaft portion of its corresponding variable vane 80, about the axis of the valve shaft. The rotation ring 102 has formed therein contact portions which respectively come into contact with the arms 100 provided for the respective variable vanes 80. By causing the contact portions to be operated in an interlocked manner, the rotation ring 102 can angularly displace the variable vanes 80 in an interlocked manner. The rotation ring 102 is provided with driving force by the actuator 68. In the present embodiment, the outer wall 102*a* of the rotation ring 102 is in contact with the spherical bodies 132 via the bolts 134, the spherical bodies 132 being fitted in the respective arms 100.

The actuator 68 causes the rotation ring 102 to be angularly displaced via a link mechanism, that is, by use of the principle of leverage. Therefore, compared with a case where the rotation ring 102 is directly rotated, an actuator 68 that has a small output can be used. In addition, since the power from the actuator 68 is transmitted to the rotation ring 102 via the link mechanism, the actuator 68 can be disposed separately from the rotation ring 102. In the present embodiment, the main body of the actuator 68 is disposed closer to the impeller 60 in the rotation axis AX direction, relative to the variable vanes 80.

By transmitting operation performed by the driver, instead of using the actuator 68, the rotation ring 102 may be driven to perform angular displacement. Specifically, a lever operated by the driver and the rotation ring 102 may be connected to each other with a wire.

When the engine E shown in FIG. 1 is started and the motorcycle travels, incoming wind is taken into the air intake duct 50. The incoming wind that has passed through the air intake duct 50 is purified in the air cleaner 40, then the amount of the incoming wind that flows into the supercharger 42 is controlled by the intake air control valve 69 shown in FIG. 2, and then, the resultant air is supplied to the supercharger 42.

The intake air is thereafter pressurized in the supercharger 42, and is then supplied to the air intake box 52. The intake air stored in the air intake box 52 shown in FIG. 1 is supplied to the engine E with its flow rate adjusted by the throttle valve 43 of the throttle body 44. When the pressure in the air intake box 52 becomes higher than a predetermined value due to a sudden close of the throttle valve 43 or the like, the relief valves 72 shown in FIG. 2 are opened, and a part of the intake air in the air intake box 52 is returned through the relief passage 74 to the clean side of the air cleaner 40.

Figure 9:
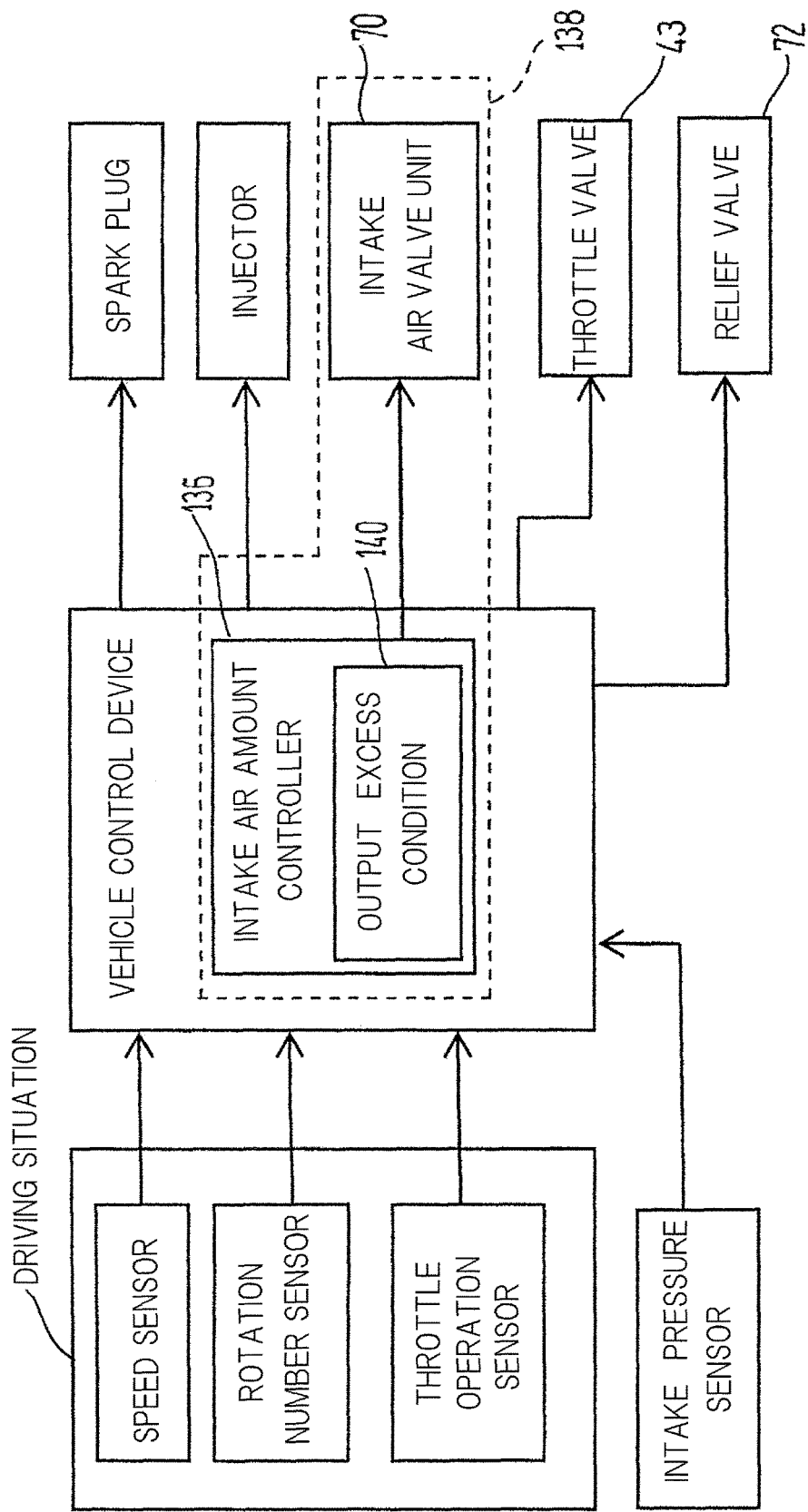
FIG. 9 is a block diagram showing a control system of the intake air control valve.

A control of the intake air control valve 69 will be described. FIG. 9 shows the control of the intake air control valve 69. The control of the intake air control valve 69 is performed by an intake air amount controller 136. The intake air amount controller 136 is implemented by an arithmetic unit which executes a predetermined program, for example. The intake air amount controller 136 of the present embodiment is included in a control device for the vehicle or for the combustion engine, but may be separately provided for dedicated use. The intake air amount controller 136 controls the intake air control valve 69 such that the variable vanes 80 are located at a position that corresponds to the driving state. The intake air amount controller 136 and the air intake control unit 70 cooperate together to form a control system 138 for the supercharger.

The intake air amount controller 136 includes: an input section into which information for determining the amount of angular displacement (intake air suppression amount) of the variable vanes 80; a storage section in which a program for determining the amount of angular displacement is stored; a calculation section which calculates the amount of angular displacement on the basis of information inputted to the input section and the program stored in the storage section; and an output section which outputs a result of the calculation. Moreover, the intake air amount controller 136 stores in advance in the storage section a map or a calculation formula for determining the amount of angular displacement of the variable vanes 80. In the present embodiment, the output section provides the actuator 68 with a drive command that corresponds to the determined amount of angular displacement. The actuator 68 operates in accordance with the drive command provided from the intake air amount controller 136, and thus, the rotation ring 102 is angularly displaced by the corresponding amount of angular displacement, whereby the variable vanes 80 are moved to the determined angularly-displaced position.

Figure 10:
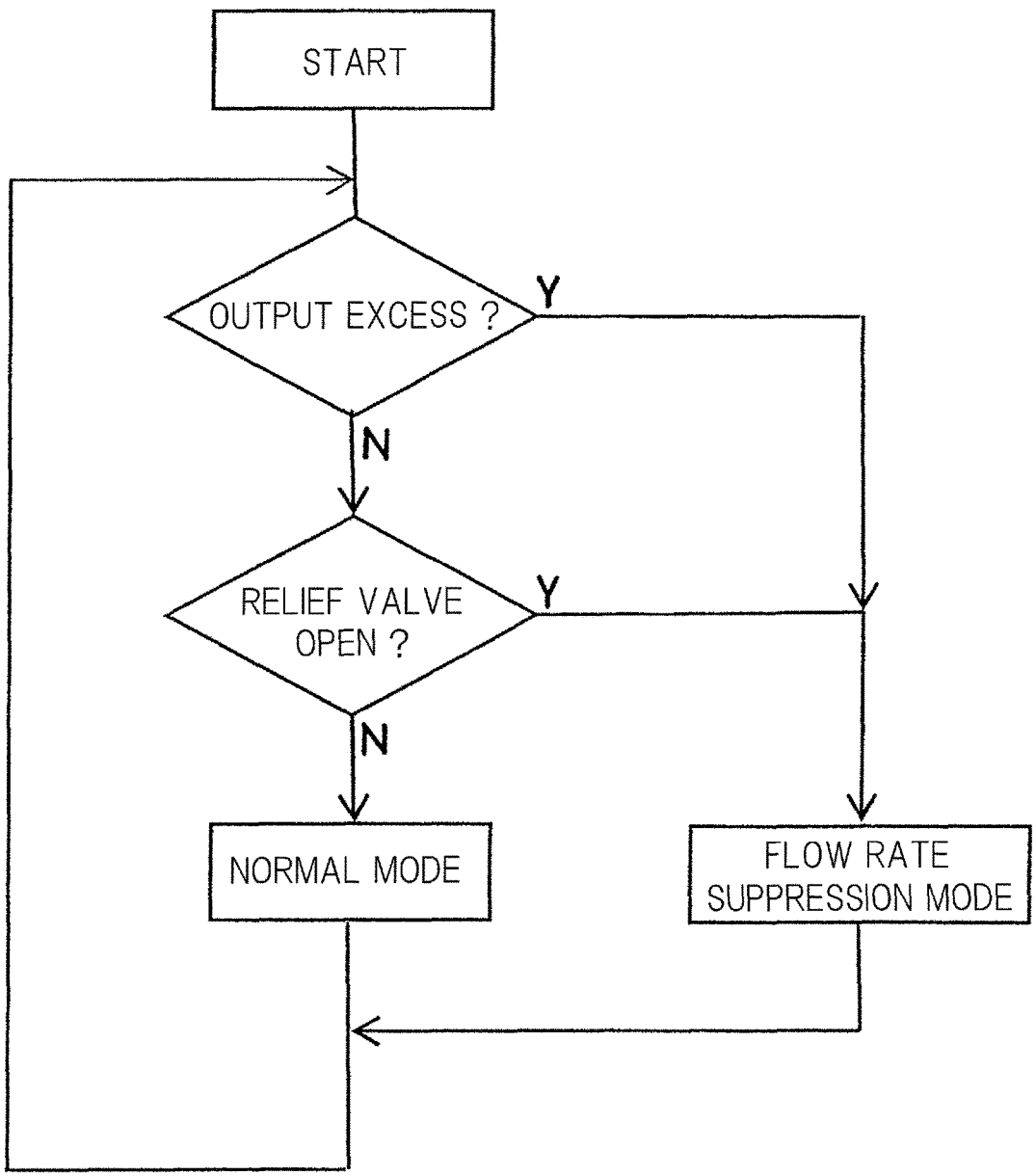
FIG. 10 is a flow chart showing a method for controlling the intake air control valve.

In the present embodiment, the intake air amount controller 136 determines a driving state by using output values of various types of sensors mounted on the motorcycle, and determines the amount of angular displacement of the variable vanes 80 that corresponds to the driving state, in accordance with a predetermined program. If the intake air amount controller 136 determines, on the basis of the output values of the various types of sensors, that the driving state is a state where the demanded output is small (a state where fuel mileage is preceded), the intake air amount controller 136 determines the amount of angular displacement of the variable vanes 80 so as to decrease the amount of intake air (a flow rate suppression mode shown in FIG. 10). If the intake air amount controller 136 determines, on the basis of the output values of the various types of sensors, that the driving state is a state where the demanded output is large (a state where enhancement of output is preceded), the intake air amount controller 136 determines the amount of angular displacement of the variable vanes so as to increase the amount of intake air (a normal mode shown in FIG. 10). It should be noted that the driving state includes either one of the driver's driving operation and the vehicle state.

The intake air amount controller 136 controls the intake air control valve 69 such that the amount of intake air is decreased relative to that in the fully-opened state when the predetermined output excess condition 140 has been satisfied. The intake air amount controller 136 determines the output excess condition 140 on the basis of a change in the vehicle state per unit time.

Examples of the driver's driving operation include a throttle operation performed by the driver. That is, if the driver performs a throttle operation to adjust the amount of intake air to be supplied to the engine E, information thereof is inputted to the intake air amount controller 136. On the basis of this information, i.e., on the basis of the operation amount of the throttle, the intake air amount controller 136 controls the intake air control valve 69. For example, if a throttle operation is performed so as to decrease the amount of intake air to be supplied to the engine E, the intake air amount controller 136 determines that the output excess condition 140 has been satisfied, and causes the intake air control valve 69 to perform a closing operation. On the other hand, if a throttle operation is performed so as to increase the amount of intake air, the intake air amount controller 136 causes the intake air control valve 69 to perform an opening operation.

The above "change in the vehicle state per unit time" includes, for example, a change in the rotation number of the engine E per unit time or in the traveling speed per unit time. That is, signals of the rotation number of the engine E, the vehicle traveling speed and the like are inputted into the intake air amount controller 136, and the intake air amount controller 136 controls the intake air control valve 69 on the basis of these signals. As one example, if the intake air amount controller 136 determines that the vehicle is in a non-acceleration state, the intake air amount controller 136 determines that the output excess condition 140 has been satisfied. The "non-acceleration state" is, for example, a constant speed state, a deceleration state or an engine brake state (a downhill traveling state) of the vehicle.

Since the power of the supercharger 42 of the present embodiment is taken out from the crankshaft 26 (FIG. 1) of the engine E, it is possible to cause a high load region of the engine E to be matched with a region where the workload of the supercharger 42 is high at the time of the acceleration, for example. On the other hand, even during a high-speed rotation of the combustion engine, there are cases where, in a low load region, the amount of intake air supplied to the supercharger 42 becomes excessive. An example of this state is the aforementioned non-acceleration state. The non-acceleration state is determined on the basis of the signals of the rotation number of the combustion engine, the vehicle traveling speed and the like, which are inputted to the intake air amount controller 136. By determining that the output excess condition 140 has been satisfied in the non-acceleration state and causing the intake air control valve 69 to perform a closing operation, it is possible to cause the supercharger 42 to operate in a high-efficiency state at all times.

The intake air amount controller 136 may further determine the fact that the relief valves 72 are in an opened state, as the output excess condition 140. The relief valves 72 are open in a state where the pressure in the air intake box 52 is higher than a predetermined value. Thus, if the relief valves 72 are open, it is determined that the output i.e., the discharge amount, of the supercharger 42 is excessive. Specifically, signals of opened/closed states of the relief valves 72 are inputted into the intake air amount controller 136, and if a signal indicating that the opened state of the relief valves 72 is inputted, the intake air amount controller 136 causes the intake air control valve 69 to perform a closing operation. Accordingly, the discharge amount of the supercharger 42 is suppressed.

If the presence of an acceleration start command or an acceleration start region is determined, the intake air amount suppression may be suppressed. Accordingly, the output enhancing effect at the time of acceleration can be increased. Further, if the presence of an end of acceleration operation or an acceleration end region is determined, the intake air amount suppression may be increased.

If the intake air amount controller 136 determines, on the basis of the driving operation performed by the driver, that the output demanded by the driver is smaller than the output obtained by using the supercharger 42, the intake air amount controller 136 may determine that the output is excessive and control the actuator 68 so as to suppress the amount of intake air. Specifically, if a state where there is no change in an acceleration operation (i.e., operation state of constant speed traveling) or a state where change in an acceleration operation is small (a state where output increase demand is small) is determined, the amount of intake air may be decreased. Other than these, if a deceleration operation caused by a brake operation or cancellation of an acceleration operation is determined, the amount of intake air may be decreased. Further, in a state where the amount of intake air has been decreased, if a state where there is a large change in an acceleration operation or a state where a deceleration operation has ended is determined, the amount of intake air may be increased.

The intake air amount controller 136 may operate on the basis of a clutch operation (FIG. 11A). Specifically, at the time of shift change for acceleration, the amount of intake air may be increased. At the time of upshift at a high reduction ratio among gear positions, by decreasing the intake air amount suppression, it is possible to suppress lowering of acceleration performance. At a shift change for deceleration, the amount of intake air may be decreased.

A switch that allows the driver to select an output precedence mode (normal mode) or a fuel mileage precedence mode (flow rate suppression mode) may be provided. In this case, if the output precedence mode is selected, the proportion of suppressing the amount of intake air may be reduced. Specifically, compared with the state before the output precedence mode is selected, it may be made more difficult to start suppressing the amount of intake air, or the suppressing amount by which to suppress the amount of intake air may be reduced. If the fuel mileage precedence mode is selected, the proportion of suppressing the amount of intake air may be increased. Specifically, compared with the state where the fuel mileage precedence mode is selected, it may be made easier to start suppressing the amount of intake air, or the suppressing amount by which to suppress the amount of intake air may be increased.

On the basis of the gear ratio, the rotation number of the combustion engine and the acceleration operation amount (throttle operation amount), the control amount for the intake air control valve 69 may be determined (FIG. 11B). Specifically, on the basis of a two-dimensional map represented by the rotation number of the combustion engine and the throttle operation amount, the suppressing amount by which to suppress the amount of intake air may be determined. In a region where the rotation number of the combustion engine is low, if the suppressing amount by which to suppress the amount of intake air is decreased compared with that in a region where the rotation number of the combustion engine is high, it is possible to increase the torque in the low rotation region. Accordingly, it is rendered to be easier to take measures against an acceleration demand. In addition, when the reduction ratio is large or at the time of the start of traveling, the demanded acceleration is large, and thus, the suppressing amount by which to suppress the amount of intake air may be decreased. In a region where the rotation number of the combustion engine is high, if the suppressing amount by which to suppress the amount of intake air is increased compared with that in a region where the rotation number of the combustion engine is low, it is possible to reduce the excessive torque in the high rotation region. Accordingly, it is rendered to be easier to improve the fuel mileage. In addition to the above-mentioned tendencies, when the throttle operation amount is large or when a change in increasing the throttle operation amount per unit time is large, i.e., when the demanded acceleration is large, if the proportion by which to suppress the amount of intake air is reduced, it is easy to reflect the driver's intention.

The intake air control valve 69 may be controlled in accordance with the traveling speed (FIG. 11C). For example, as the traveling speed is increased, the intake air amount suppression may be increased accordingly. In the present embodiment, since the incoming wind is introduced into the suction port 46 of the supercharger 42, the higher the vehicle speed (the pressure of the incoming wind) is, the higher the output is. In a state where the traveling speed is high and when output is not necessary, the amount of intake air is restricted by the intake air control valve 69, thereby the workload of the supercharger can be reduced. If suppressing control by the intake air control valve 69 is canceled in accordance with an output increase command made by the driver, the output can be increased. Accordingly, the workload of the supercharger in a non-acceleration region can be suppressed, and the fuel mileage can be improved while the output is enhanced. In a vehicle speed region where the pressure of the incoming wind is excessive, the work of the supercharger 42 caused by the excessive ram pressure increase may be reduced by increasing suppression of the amount of intake air.

The mounting angle θ that realizes appropriate air intake efficiency in accordance with the rotation number of the impeller may be set in advance. The intake air amount controller 136 may control the actuator 68 so as to angularly displace the variable vanes 80 such that the variable vanes 80 take the mounting angle θ that is set for each rotation number of the impeller. Accordingly, efficiency can be improved. In the present embodiment, providing a preswirl and controlling the amount of intake air are realized by one kind of variable vane 80, whereby the number of components can be decreased, and the fuel consumption can be reduced through improvement of the air intake efficiency. Two kinds of variable vanes may be provided for providing the preswirl and for controlling the amount of intake air, respectively. With respect to the preswirl, the output may be preceded and the mounting angle θ may be set in accordance with the rotation number of the impeller. Alternatively, the mounting angle θ may be set to a corrected angle, in consideration of the fuel consumption, with the efficiency preceded.

Among various driving states, in a condition where surging is easy to occur in the supercharger 42 (for example, low rotation region of the combustion engine), the intake air control valve 69 may restrict the amount of intake air in order to suppress surging. When the surging occurring condition is different for each driving condition, the amount of intake air may be restricted in accordance with the driving condition. Accordingly, the output can be enhanced, while surging is suppressed.

A medium opening degree that allows a preswirl to be obtained and that allows reduction of a predetermined amount of fuel consumption may be set as default. In this case, when a state where output is demanded is determined, the opening degree may be controlled so as to be increased relative to the opening degree set as default. When a state, where excessive output occurs, such as, for example, constant speed travel is determined, control may be performed such that the opening degree is reduced relative to the opening degree set as default.

When a condition of suppressing the output of the combustion engine has occurred due to another factor such as slip suppression, wheelie suppression, rotation number limiter control, speed limiter control, engine brake suppression, traveling-start control or the like, intake air amount suppression control may be executed in association therewith. Specifically, as shown in FIG. 9, at the time when the output of the combustion engine main body itself is suppressed by means of the throttle valve 43, a fuel injection valve, an ignition plug and the like, the suppressing amount for the intake air control valve 69 caused by the intake air amount controller 136 may be increased.

In order to determine a state where slipping is likely to occur due to the difference between the rotation numbers of the front and rear wheels 10, 14, or in order to prevent the amount of intake air from becoming excessive as observed at the time of determining the start of traveling, a control of the amount of intake air may be set for each driving state. For example, in accordance with decrease in the tendency of the output becoming excessive, the suppression of the amount of intake air may be reduced. The tendency of the output becoming excessive may be determined on the basis of the gear ratio, the rotation number of the combustion engine, the acceleration operation amount and the like, in addition to the output excess condition 140 mentioned above.

The throttle valve 43 may also be controlled by the intake air amount controller 136. The intake air control valve 69 may be controlled in association with the control of the throttle valve 43. Operation of the intake air control valve 69 may be delayed relative to operation of the throttle valve 43. This makes it easy to realize both of responsiveness and reduction of fuel consumption. In addition, at the time of acceleration operation, the amount of intake air may be increased concurrently with the operation of the throttle valve 43. Accordingly, responsiveness can be improved.

When the intake air control valve 69 is controlled in accordance with a throttle operation, in a case where improvement of responsiveness is desired, if a change in the throttle operation per unit time is large, response of the intake air control valve 69 to the throttle operation may be made quicker. In a case where reduction of shock caused by sudden change in output is desired, if a change in the throttle operation per unit time is large, response of the intake air control valve to the throttle operation may be set to be mild. Responsiveness of the intake air control valve may be set by the driver, and reaction of the intake air control valve to the throttle operation, for example, responsiveness, sensitivity (gain), delay time and the like, may be changed by using thresholds obtained from the driving state.

Further, in the case of the fuel mileage precedence mode, if a traveling stopped state or an idle state is determined, the intake air control valve may be controlled so as to be fully closed. The traveling stopped state can be determined on the basis of the switch of the side stand, the output of the speed sensor or the like, for example. The idle state can be determined on the basis of the output of an engine rotation number sensor.

According to the above configuration, the amount of intake air flowing into the impeller 60 of the supercharger 42 is adjusted by the intake air control valve 69. Therefore, for example, in a low load region of the engine E, if the flow-in amount of the intake air I is decreased by throttling the intake air control valve 69, workload of the supercharger 42 can be decreased and the fuel consumption can be reduced. At the same time, the amount of the intake air I can be prevented from being excessive. In the above embodiment, power of the supercharger 42 is taken out from the crankshaft 26 (FIG. 1) of the engine E. However, since the workload of the supercharger is reduced, the fuel mileage of the motorcycle is improved.

The impeller housing 61 shown in FIG. 2 includes an upstream portion, in the flow direction of the intake air relative to the impeller 60, formed in a cylindrical shape. The impeller housing 61 is formed with the suction port 46 which is open to the upstream side in the flow direction of the intake air. Intake air is sucked through the suction port 46 of the impeller housing 61 due to rotation of the impeller 60. The impeller housing 61 is formed with the discharge port 48 which is located at the radially outer side of the impeller 60 and which is open to the downstream side in the flow direction of the intake air. Intake air sucked into the impeller housing 61 is provided with a force directed toward the radial direction relative to the supercharger rotation shaft 62, by the centrifugal force of the rotating impeller 60. The intake air inside the impeller housing 61 is pushed out to the downstream side in the flow direction of the intake air through the discharge port 48 due to the rotation of the impeller 60, and is guided to the air intake box 52.

That is, by the impeller 60 rotating, the intake air guided to the impeller 60 is sent to the radially outer side by the centrifugal force. The intake air is guided by the impeller housing 61 so as to be introduced into the air intake box 52. The larger the rotation number of the impeller 60 is, or the higher the pressure of the intake air on the upstream side of the impeller 60 is, the larger the amount of air (workload) to be pressure-fed per rotation is. Accordingly, the pressure in the chamber is increased, and the output is increased.

The supercharger 42 of the present embodiment is driven by a part of the output of the combustion engine which is used as driving force for traveling. Therefore, in a situation where increase of output by supercharging is not necessary, there are cases where rotation drive of the impeller 60 using the output of the combustion engine causes a lowered fuel mileage as mechanical loss. In the present embodiment, by using the intake air control valve 69 to suppress the amount of intake air to be introduced to the upstream side of the supercharger 42, the amount of air (workload) to be pressure-fed per rotation of the impeller 60 can be reduced. Since the amount of intake air can be changed by the intake air control valve 69 in accordance with the situation, it is possible to enhance the output by the supercharger 42, and to reduce mechanical loss, i.e., to reduce the workload, caused by the supercharger 42 in a situation where enhancement of output is not necessary. That is, it is easy to realize both enhancement of output and improvement of the fuel mileage.

Further, on the downstream side of the supercharger 42 in the air intake passage 45, the throttle valve 43 is disposed. That is, the intake air amount controller 136 controls the intake air control valve 69 on the basis of the operation amount of the throttle valve 43. Thus, by providing the intake air control valve 69 separately from the throttle valve 43, it is possible to reduce the fuel consumption by the intake air control valve 69, while the amount of intake air to be supplied to the engine E is adjusted by the throttle valve 43.

The intake air control valve 69 may be operated in association with either of the throttle operation or the operation amount of the throttle valve 43. Here, the "operation amount of the throttle valve 43" means the amount of drive of the throttle valve 43 itself (flow rate through the valve), and the "throttle operation" means that the operation amount of the throttle grip. It is sufficient that these two operations are operations that are related with each other and that are caused under some influence, and tendencies or operation amounts thereof may be changed. The throttle valve 43 may be a sub-throttle or a wire-type throttle valve, other than the electric throttle.

Since the throttle valve 43 of the present embodiment is an electric throttle, in a case where the intake air control valve 69 is operated due to another factor than the throttle operation performed by the driver, if the operation amount of the intake air control valve 69 is kept constant, the output of the throttle valve 43 is changed, which could affect the feeling of the driver. In order to prevent this, if change in the output by the engine E is not desired, such as in a constant speed traveling state, for example, intake air amount increasing control by the throttle valve 43 may be executed, corresponding to intake air amount decreasing control by the intake air control valve 69. By controlling the throttle valve 43 in this manner, it is possible to suppress change in the output of the engine E due to control of the intake air control valve 69. As a result, impaired feeling of the driver can be prevented.

In contrast to this, when the intake air control valve 69 is operated due to a factor caused by a throttle operation, it is preferable to control the intake air control valve 69 so as to follow the operation tendency of the throttle valve 43. Accordingly, it is possible to also cause the control of the intake air control valve 69 to contribute to an output change made in response to an output change command from the driver, whereby responsiveness is improved.

As shown in FIG. 6, the intake air control valve 69 provides the intake air I flowing into the impeller 60 with the preswirl SF in a direction reverse to the rotation direction of the impeller 60. That is, the intake air amount controller 136 shown in FIG. 7 controls the intake air control valve 69 such that the variable vanes 80 come to a rotation position that corresponds to the driving state. Accordingly, the intake air control valve 69 can be used in two ways: for improving heat insulating efficiency by providing the intake air with an appropriate preswirl before the intake air is compressed by the rotation of the impeller 60; and for improving the fuel mileage by adjusting the flow-in amount of the intake air I.

Incoming wind is introduced through the air intake duct 50 to the supercharger 42. Thus, air whose pressure has been increased by a ram pressure is supplied to the supercharger 42, and thus, the output of the supercharger 42 is enhanced. On the other hand, in a case of a constant speed traveling even during high speed traveling, there are cases where the amount of intake air to be supplied to the supercharger 42 becomes excessive as a result of the pressure of the intake air having been increased by a ram pressure. In the above configuration, by throttling the intake air control valve 69 when the pressure of the incoming wind is high, it is possible to suppress the pressure in the air intake duct 50 to decrease the workload of the supercharger 42, thereby to reduce the fuel consumption.

When the relief valves 72 are in the opened state, the intake air amount controller 136 controls the intake air control valve 69 in the close direction. Thus, by closing the intake air control valve 69 when the relief valves 72 are in the opened state, that is, when the pressure in the air intake box 52 is high, it is possible to decrease the amount of the intake air flowing into the supercharger 42, thereby to suppress the discharge amount of the supercharger 42.

Specifically, when the relief valves 72 are in operation, the pressure on the upstream side of the supercharger 42 is increased. However, by restricting the amount of intake air by means of the intake air control valve 69, it is possible to prevent the pressure on the inlet side of the supercharger 42 from becoming high, and thus, it is possible to reduce the workload of the supercharger. That is, through the intake air amount suppression performed by the intake air control valve 69 in association with the operation of the relief valves 72, it is possible to reduce the workload in a preferable manner. In addition, prior to the operation of the relief valves 72, the intake air amount suppression control by the intake air control valve 69 may be executed. For example, when a set pressure that is lower than a predetermined relief pressure is reached, the intake air amount suppression control by the intake air control valve 69 may be executed. Accordingly, operation of the relief valves 72 can be restricted. Alternatively, the intake air amount suppression control by the intake air control valve 69 may be started substantially at the same time when the operation of the relief valves 72 is made.

Until the pressure in the air intake box 52 reaches a predetermined value, the intake air control valve 69 may be set to be fully opened. Accordingly, the pressure in the air intake box 52 that would be able to bring the output effect made by the supercharging can be quickly reached. The intake air control valve 69 may be controlled such that, when the pressure in the air intake box 52 reaches a predetermined value, a predetermined pressure range is maintained. Specifically, when the pressure has decreased lower than the pressure range, the amount of intake air may be increased, and when the pressure has increased higher than the pressure range, the amount of intake air may be decreased. Accordingly, the workload of the supercharger can be restricted while the supercharging effect is attained. Also, if the above-described predetermined pressure range is set to be variable in accordance with the driving state, it is easy to realize both of enhancement of output and fuel consumption reducing effect.

As shown in FIG. 3, the intake air control valve 69 includes the plurality of variable vanes 80 which are radially arranged, and the mounting angle about the radial axis of each variable vane 80 is set to be adjustable. Therefore, compared with a case employing an intake air control valve, that has a single valve body, such as a butterfly valve, the air intake system can be downsized.

The driving force for the supercharger 42 shown in FIG. 1 is taken out from the upstream side relative to the gearbox 13 in the power transmission path. Accordingly, irrespective of the operation of the gearbox 13, driving force for the supercharger 42 can be stably obtained from the engine E.

The intake air amount controller 136 shown in FIG. 7 controls the intake air control valve 69 such that the amount of intake air is decreased when a predetermined output excess condition 140 is satisfied. Accordingly, the amount of intake air to be supplied to the supercharger 42 can be prevented from becoming excessive. As a result, the workload of the supercharger 42 is reduced, and the fuel consumption is reduced.

When the predetermined output excess condition 140 is not satisfied, output obtained by supercharging is maintained. When the output excess condition is satisfied, increase in output by supercharging is restricted so as to suppress the output excess state, whereby the fuel mileage can be improved. In this manner, the fuel mileage can be improved when output is not necessary, whereas output can be maintained when necessary. Therefore, it is possible to realize both enhancement of output and improvement of the fuel mileage.

The intake air amount controller 136 determines the output excess condition 140 on the basis of the driving operation performed by the driver. Accordingly, shortage/excess of the output of the combustion engine can be prevented, with the driver's intention reflected. By being based on the driver's operation, it is possible to control the valve with the driver's intention reflected. Accordingly, undesired suppression of output can be prevented, or maintaining output to an excessive extent can be prevented.

The intake air amount controller 136 determines the output excess condition 140 on the basis of a change in the vehicle state per unit time. Thus, by realizing valve control based on such a change per unit time, it is possible to reduce the workload of the supercharger 42, thereby to reduce the fuel consumption. By being based on the vehicle state, it is possible to determine the presence/absence of excessive output. In addition, by determining on based of the driver's operation or a change in the vehicle state per unit time, it is easy to estimate the future state. Also, the basis of the estimated future state, it is possible to determine the presence/absence of excessive output. For example, when the change per unit time is large, by making a quick response in the valve control, responsiveness is easily improved.

Further, since the above configuration allows variable control of the amount of intake air for each driving state, stepwise or continuous control can be performed in addition to the fully-opening/closing control. Accordingly, when an appropriate amount of intake air is set for each driving state, e.g., when an appropriate amount of intake air is set for each driving state in order to prevent surging decrease, it is easy to control the amount of intake air by using the appropriate amount of intake air as a target.

Further, the intake air amount controller 136 determines that the output excess condition 140 has been satisfied when it is determined that the vehicle is in a non-acceleration state. Accordingly, as described above, the workload of the supercharger 42 is reduced, whereby the fuel mileage of the motorcycle is improved.

As shown in FIG. 2, the intake air control valve 69 is connected to the suction port 46 of the supercharger 42, and each variable vane 80 of the intake air control valve 69 shown in FIG. 4 is set such that the mounting angle of the radial axis is adjustable in a state where the root portion 80*a* and the tip end portion 80*b* are supported. Accordingly, stable support of the variable vane 80 is realized.

Since the variable vane 80 is supported at both ends thereof in this manner, displacement of the variable vane 80 can be prevented even when the variable vane 80 is subjected to vibration from a road surface or to change (rolling, pitting, etc.) in the attitude of the vehicle body. As a result, the variable vane 80 can be prevented from colliding with another component. For example, by preventing the variable vane 80 from being displaced under external force, it is possible to reduce the clearance between the variable vane 80 and the impeller housing 61. Accordingly, the guiding effect by the variable vane 80 is enhanced, and the flow rate restricting effect realized is enhanced by increase in the size of the variable vane 80.

Further, the guide body 84 in which the four fixed vanes 82 are radially disposed as shown in FIG. 3 is disposed on the upstream side of the intake air control valve 69. Each fixed vane 82 is disposed at the same position, in the circumferential direction, as that of its corresponding variable vane 80. Accordingly, intake air can be smoothly guided by the fixed vane 82 and the variable vane 80. In addition, since the root portion 80*a* of each variable vane 80 is supported by the guide body 84 shown in FIG. 4, it is easy to support the root portion 80a of each variable vane 80.

For example, when intake air swirls from the upstream side relative to the fixed vanes 82, or flows in an inclined direction relative to the flow direction thereof, the flow of the intake air can be rectified by the fixed vane 82. Accordingly, the rectified intake air is guided by the variable vane 80, and thus, the intake air guiding effect can be enhanced. In the present embodiment, since the air intake duct 50 is disposed at a lateral side of the engine E in the vehicle widthwise direction, the intake air is guided, with the flow thereof being bent about 90° on the upstream side of the supercharger 42, by the air intake duct 50. Accordingly, the intake air flowing into the supercharger 42 is apt to be disturbed, and thus, it is effective to provide the fixed vanes 82.

As shown in FIG. 6, when the intake air control valve 69 is fully open, the variable vane 80 and the fixed vane 82 are aligned with each other, viewed in the axial direction. Accordingly, resistance of the intake air control valve 69 at the fully-opened position is reduced.

The position of the variable vane 80 in the circumferential direction is at a position shifted from the position in the circumferential direction of the bolt 96 which fixes the impeller housing 61 and the guide body 84 together. Accordingly, the bolt 96 does not interfere with the variable vane 80 during the work of attaching/detaching the bolt 96, and thus, workability is not reduced.

The variable mechanism 98 for the variable vanes 80 shown in FIG. 4 includes: the arm 100 coupled to each variable vane 80; and the rotation ring 102 coupled to the tip end portion 100a of each arm 100, and allows the rotation ring 102 to be rotated, thereby causing each variable vane 80 to be rotated via the arm 100. A cam mechanism is used to angularly displace a portion fixed to the portion that is in contact with the plurality of the arms 100, whereby the plurality of the variable vanes 80 are operated in an interlocked manner by a single actuator 68. By causing the variable vanes 80 to be operated in an interlocked manner, it is possible to realize a compact configuration compared with that of a case where the actuator 68 is provided for each variable vane 80. Further, the arms 100 extend in parallel to the rotation axis AX, and are arranged with an interval therebetween in the circumferential direction of the rotation axis AX. Therefore, increase in the dimension in the radial direction of the air intake control unit 70 due to the arrangement of the arms 100 can be prevented.

The rotation ring 102 is disposed around the outer periphery of the guide body 84. Thus, the guide body 84 and the rotation ring 102 overlap each other in the radial direction. Accordingly, increase in the dimension in the axial direction of the intake air control valve 69 can be prevented.

As shown in FIG. 3, the intake air control valve 69 and the actuator 68 are supported by the casing 65 of the supercharger 42. Thus, a sub-assembly can be configured by assembling the intake air control valve 69 and the actuator 68 to the casing 65 of the supercharger 42. Then, by assembling the supercharger 42 to the engine E, the intake air control valve 69 and the actuator 68 can also be mounted to the engine E, and thus, assemblability is improved.

As shown in FIG. 2, the actuator 68 is disposed rearward of the supercharger 42. In many cases, various components are disposed on the rear side of the cylinder unit CY. However, since the actuator 68 is disposed rearward of the supercharger 42, the actuator 68 can be prevented from interfering with another component.

Depending on the installation space or when interference with another component can be avoided, the actuator 68 may be disposed forward of the supercharger 42. In this case, the actuator 68 does not project rearward from the rear end of the crankcase 28, and thus, the dimension of the engine E in the front-rear direction or longitudinal direction can be reduced.

Since the arm 100 and the valve body portion 80c of the variable vane 80 are detachably fixed to each other, assemblability is improved. In the present embodiment, the arm 100 and the valve shaft portion of the variable vane 80 are detachably fixed to each other. Preferably, a passage that guides incoming wind to the actuator 68 is provided. Accordingly, rise in the temperature of the actuator 68 can be suppressed. By providing a through-hole for preventing heat from remaining in the casing of the actuator 68, it is possible to further suppress rise in the temperature of the actuator 68. If the actuator 68 is fastened together with the impeller housing 61 and the transmission mechanism housing 67 by means of a bolt for coupling the impeller housing 61 and the transmission mechanism housing 67, the number of components can be reduced.

Although the variable vane 80 of the above embodiment has a function of providing a preswirl in addition to the function of adjusting the flow rate, the variable vane 80 may not have the function of providing the preswirl. The direction of the preswirl may be set to a direction reverse to the direction employed in the above embodiment. For example, at the medium opening degree, when reduction in the workload is desired, intake air may be guided so as to be directed to the rotation direction of the impeller 60. Further, the fixed vanes 82 may not be provided. Even in such a case, it is preferable that the variable vane 80 is structured such that both ends thereof are supported.

The mechanism which angularly displaces the rotation ring 102 is not limited to that in the above embodiment. For example, by use of a rack and pinion mechanism instead of the link mechanism, rotation of the output shaft 68a of the actuator 68 may be converted into a force that angularly displaces the rotation ring 102. Alternatively, a gear may be formed on the outer periphery of the rotation ring 102, and a gear wheel which is meshed with the gear may be rotated by the actuator 68. Still alternatively, by use of a direct-driven-type actuator, the rotation ring 102 may be angularly displaced. Furthermore, by use of an ultrasonic motor or the like, the rotation ring 102 may be directly angularly displaced, not via the variable mechanism 98.

The configuration of the variable mechanism 98 is not limited to the above embodiment. For example, the variable mechanism 98 may be realized by a rack and pinion mechanism instead of the cam mechanism. Specifically, a pinion portion formed in a disk or arc shape and having teeth formed on the outer peripheral surface thereof may be provided in the valve shaft portion, and a rack portion meshed with the teeth of the pinion may be provided in the rotation ring 102. Even in this case, since the position where the pinion portion is meshed with the rack portion is changed in accordance with the angular displacement of the rotation ring 102, the valve shaft portion is angularly displaced. By applying a structure other than the above, it is also possible to angularly displace the valve shaft portion in an interlocked manner.

In the medium-open state, a lateral surface, of the fixed vane 82, which is one surface thereof in the circumferential direction relative to the rotation axis AX, and a flow direction upstream-side part of the guide surface, of the corresponding variable vane 80, which is one surface thereof in the circumferential direction relative to the rotation axis AX may be disposed so as to be on the same plane. Accordingly, intake air guided by the fixed vane 82 can be smoothly guided to the variable vane 80, whereby the effect of the preswirl can be enhanced. Specifically, if a predetermined medium opening degree is set to an opening degree for which the preswirl effect needs to be enhanced, it is possible to effectively provide a preswirl. For example, an opening degree that enhances the effect of the preswirl is set as a standard position. In this case, if increase in output is determined with respect to the standard position, the variable vane 80 may be operated to the fully-open direction. On the other hands, if decrease in output is determined with respect to the standard position, the variable vane 80 may be operated to the fully-close direction.

The present invention is not limited to the above-described embodiment, and various additions, changes, or deletions can be made without departing from the gist of the present invention. In the above embodiment, an example to be applied to a combustion engine for a motorcycle has been described. However, the supercharger 42 of the present invention can be applied to a combustion engine for a vehicle other than a motorcycle. Therefore, this is also construed as included within the scope of the present invention.

REFERENCE NUMERALS

- 40 . . . air cleaner
- 42 . . . supercharger
- 43 . . . throttle valve
- 50 . . . air intake duct
- 52 . . . air intake box
- 60 . . . impeller
- 65 . . . casing
- 69 . . . intake air control valve
- 72 . . . relief valve
- 74 . . . relief passage
- 80 . . . variable vane
- 80*a* . . . root portion
- 80*b* . . . tip end portion
- AX . . . rotation axis
- AY . . . radial axis
- E . . . combustion engine
- θ . . . mounting angle

What is claimed is:

1. A combustion engine air intake system in a motorcycle, the combustion engine air intake system comprising:
    a supercharger configured to be driven by power of a combustion engine of the motorcycle and compress intake air to be supplied to the combustion engine; and
    an intake air control valve disposed on an upstream side of an impeller of the supercharger with respect to a flow direction of the intake air, and configured to adjust an amount of the intake air flowing into the impeller, wherein
    the intake air control valve includes a plurality of valve bodies, the valve bodies being arranged in a circumferential direction, and
    the intake air control valve is disposed so as to confront an inlet of the supercharger with respect to the flow direction of the intake air.

2. The combustion engine air intake system for the motorcycle as claimed in claim 1, wherein
    the intake air control valve is directly connected to an impeller housing which covers the impeller of the supercharger.

3. The combustion engine air intake system for the motorcycle as claimed in claim 1, further comprising a throttle valve disposed on a downstream side of the supercharger in an air intake passage with respect to the flow direction, and configured to adjust the amount of the intake air to be supplied to a cylinder of the combustion engine, wherein
    the throttle valve is opened and closed on the basis of a throttle operation performed by a rider.

4. The combustion engine air intake system for the motorcycle as claimed in claim 1, wherein
    the intake air control valve is, in addition to an adjustment of the amount of the intake air flowing into the impeller, configured to guide the intake air so as to swirl about a rotation shaft of the impeller.

5. The combustion engine air intake system for the motorcycle as claimed in claim 4, wherein the intake air control valve is configured to adjust a guiding amount of air in a swirl direction in accordance with a change in the amount of the intake air.

6. The combustion engine air intake system for the motorcycle as claimed in claim 4, wherein the intake air control valve includes:
    a plurality of valve shafts radially arranged relative to the rotation shaft of the impeller; and
    the valve bodies are provided for the respective valve shafts, and configured to be angularly displaced about axes of the valve shafts, respectively, and
    at a medium opening degree, each valve body is displaced to one side in a circumferential direction of the rotation shaft of the impeller, so as to extend from upstream toward downstream in the flow direction of the intake air.

7. The combustion engine air intake system for the motorcycle as claimed in claim 1, wherein the intake air control valve includes:
    a plurality of valve shafts radially arranged relative to the rotation shaft of the impeller; and
    the valve bodies are provided for the respective valve shafts, and configured to be angularly displaced about axes of the valve shafts, respectively.

8. The combustion engine air intake system for the motorcycle as claimed in claim 1, further comprising:
    an air intake box disposed on the downstream side of the supercharger with respect to the flow direction and configured to store the intake air, wherein
    an outlet of a relief passage of the air intake box is in communication with an upstream side of the intake air control valve in the air intake passage with respect to the air flow direction.

9. A control system for controlling a supercharger for a combustion engine of a vehicle, which supercharger is driven by power from the combustion engine and compresses intake air to be supplied to the combustion engine, the control system comprising:
    an intake air control valve disposed on an upstream side of the supercharger with respect to a flow direction of the intake air; and
    an intake air amount controller configured to control the intake air control valve so as to decrease an amount of the intake air when a predetermined output excess condition has been satisfied, wherein the intake air control valve includes a plurality of valve bodies, the valve bodies being arranged in a circumferential direction.

10. The control system for controlling the supercharger for the combustion engine of the vehicle as claimed in claim 9, wherein
the intake air amount controller determines the output excess condition on the basis of a driving operation performed by a driver.

11. The control system for controlling the supercharger for the combustion engine of the vehicle as claimed in claim 9, wherein
the intake air amount controller determines the output excess condition on the basis of a vehicle state.

12. The control system for controlling the supercharger for the combustion engine of the vehicle as claimed in claim 9,
wherein by controlling the intake air control valve, the intake air amount controller provides a preswirl set in advance, to the intake air flowing into an impeller of the supercharger.

13. The control system for controlling the supercharger for the combustion engine of the vehicle as claimed in claim 9, wherein
an air intake box configured to store the intake air is disposed on a downstream side of the supercharger with respect to the flow direction,
a relief valve is provided on the air intake box, the relief valve being configured to be opened, when a pressure in the air intake box becomes a predetermined value or higher, to cause a relief passage to be communicated with the air intake box,
the relief passage is in communication with the upstream side of the supercharger in an air intake passage with respect to the flow direction, and
the intake air amount controller controls the intake air control valve in a closing direction when the relief valve is open.

14. The control system for controlling the supercharger for the combustion engine of the vehicle as claimed in claim 9, wherein
a throttle valve which controls the amount of the intake air in accordance with a throttle operation performed by a driver is disposed on a downstream side of the supercharger in the air intake passage with respect to the flow direction, and
the intake air amount controller controls the intake air control valve on the basis of an operation amount of the throttle valve.

15. The control system for controlling the supercharger for the combustion engine of the vehicle as claimed in claim 9, wherein
the intake air amount controller determines that the output excess condition has been satisfied when it has been determined that the vehicle is in a non-acceleration state.

16. An air intake control unit disposed at an inlet of a supercharger which compresses intake air for a combustion engine, the air intake control unit comprising an intake air control valve in which a plurality of variable vanes are radially disposed relative to an axial direction of the valve, wherein
the intake air control valve includes a valve casing which covers the variable vanes,
the variable vanes are each set such that a mounting angle about a radial axis of the valve is adjustable in a state where a root portion of the variable vane and a tip end portion of the variable vane are supported, and
an area of the variable vanes, which area blocks an opening of the valve casing, is changed by adjusting the mounting angle of the variable vanes.

17. The air intake control unit for the supercharger as claimed in claim 16, wherein the intake air control valve includes:
a plurality of fixed vanes radially disposed relative to the axial direction on an upstream side of the intake air control valve with respect to a flow direction of the intake air; and
a guide body provided with the fixed vanes, and
the root portion of each variable vane is supported by the guide body.

18. The air intake control unit for the supercharger as claimed in claim 16, wherein the intake air control valve includes:
a plurality of fixed vanes radially disposed relative to the axial direction on an upstream side of the intake air control valve with respect to a flow direction of the intake air; and
a guide body provided with the fixed vanes, and
when the intake air control valve is fully open, at least one of the variable vanes of the intake air control valve is aligned with a corresponding one of the fixed vanes of the guide body in the axial direction view.

19. The air intake control unit for the supercharger as claimed in claim 16, further comprising a variable mechanism configured to adjust the mounting angle of each variable vane, wherein the variable mechanism includes:
an arm coupled to each variable vane; and
a rotation ring coupled to a tip end portion of each arm, and allows the rotation ring to be rotated, thereby causing the variable vanes to be rotated via the arm.

20. The air intake control unit for the supercharger as claimed in claim 19, wherein the intake air control valve includes:
a plurality of fixed vanes radially disposed relative to the axial direction on an upstream side of the intake air control valve with respect to a flow direction of the intake air, and
a guide body provided with the fixed vanes, and the rotation ring is disposed around an outer periphery of the guide body.

* * * * *